(12) United States Patent
Sepulveda

(10) Patent No.: US 7,292,250 B2
(45) Date of Patent: Nov. 6, 2007

(54) CHARACTER DEFORMATION PIPELINE FOR COMPUTER-GENERATED ANIMATION

(75) Inventor: Miguel A. Sepulveda, Los Angeles, CA (US)

(73) Assignee: Dreamworks Animation, LLC, Glendale, CA (US)

( * ) Notice: Subject to any disclaimer, the term of this patent is extended or adjusted under 35 U.S.C. 154(b) by 242 days.

(21) Appl. No.: 10/816,474

(22) Filed: Mar. 31, 2004

(65) Prior Publication Data

US 2005/0219250 A1    Oct. 6, 2005

(51) Int. Cl.
 *G06T 13/00* (2006.01)
(52) U.S. Cl. .................. 345/473; 345/419; 345/420
(58) Field of Classification Search ............ None
 See application file for complete search history.

(56) References Cited

U.S. PATENT DOCUMENTS

| | | | |
|---|---|---|---|
| 6,061,067 A * | 5/2000 | Silva et al. ................. | 345/619 |
| 6,222,553 B1 | 4/2001 | DeRose et al. | |
| 6,236,403 B1 | 5/2001 | Chaki et al. | |
| 6,300,960 B1 | 10/2001 | DeRose et al. | |
| 6,489,960 B2 | 12/2002 | DeRose et al. | |
| 6,535,215 B1 | 3/2003 | DeWitt et al. | |
| 6,538,651 B1 | 3/2003 | Hayman et al. | |
| 6,573,890 B1 | 6/2003 | Lengyel | |
| 6,608,631 B1 * | 8/2003 | Milliron ..................... | 345/647 |
| 2004/0001064 A1 | 1/2004 | Boyd et al. | |
| 2005/0057569 A1 * | 3/2005 | Berger ...................... | 345/473 |

OTHER PUBLICATIONS

Biermann, Henning, et al., "Piecewise Smooth Subdivision Surfaces With Normal Control", Proceedings of the 27th International Conference on Computer Graphics and Interactive Techniques, New Orleans, Louisiana, 2000, pp. 113-120.
Catmull, E. et al., "Recursively Generated B-Spline Surfaces on Arbitrary Topological Meshes", Computer Aided Design, vol. 10, No. 6, pp. 350-355, Nov. 1978.
Forsey, D. R. et al., "Surface Fitting with Hierarchical Splines," ACM Transactions on Graphics, vol. 14, No. 2, Apr. 1995, pp. 134-161.
Guibas, Leonidas, et al., "Primitives for the Manipulation of General Subdivisions and the Computation of Voronoi Diagrams," ACM Transactions on Graphics, vol. 4, No. 2, Apr. 1985, pp. 74-123.
Lee, Aaron, et al., "Displaced Subdivision Surfaces", Proceedings of the 27th International Conference on Computer Graphics and Interactive Techniques, New Orleans, Louisiana, 2000, pp. 85-94.

(Continued)

*Primary Examiner*—Kee M. Tung
*Assistant Examiner*—Said Broome
(74) *Attorney, Agent, or Firm*—Morrison & Foerster LLP

(57) ABSTRACT

A deformation system for animation abstracts the notion of per-point deformation to create a pipeline, including a number of deformation modules capable of handling animation of geometry (such as characters), dynamics (such as simulations) and/or effects (such as particle systems). Deformation pipelines are defined, that work as templates capable of deforming and animating families of similar characters. Support is provided for various binding modes, including sequential, parallel, blend, and hierarchical, so as to facilitate several techniques for combining deformations.

93 Claims, 16 Drawing Sheets

OTHER PUBLICATIONS

Loop, Charles Teorell, "Smooth Subdivision Surfaces Based on Triangles", Master's thesis, Department of Mathematics, The University of Utah, Aug. 1987, pp. 1-60.

MacCracken, Ron, et al., "Free-Form Deformations With Lattices of Arbitrary Topology", Proceedings of the 23rd International Conference on Computer Graphics and Interactive Techniques, 1996, pp. 181-190.

Zorin, Denis, et al., "Course 23: Subdivision for Modeling and Animation at the 27th International Conference on Computer Graphics and Interactive Techniques,"SIGGRAPH 2000 Course Notes, New Orleans, Louisiana, 2000.

European Search Report mailed Jul. 6, 2005, for European application No. EP 05252035 filed Mar. 31, 2005, 4 pages.

Gagvani, Nikhil et al. (1998) "Volume Animation using the Skeleton Tree," Proceedings of the 1998 IEEE Symposium on Volume Visualization, Research Triangle Park, NC, USA, Oct. 19-20, 1998, pp. 47-53.

Preda, Marius et al. (2002) "Critic Review on MPEG-4 Face and Body Animation," Prodeedings of the 2002 International Conference on Image Processing, Rochester, NY, USA, Sep. 22-25, 2002, pp. 505-508.

Preda, Marius et al. (2002) "Insights into low-level avatar animation and MPEG-4 standardization," Signal Processing: Image Communication, 17: 717-741.

Chua, C. et al., "A layered approach to deformable modeling and animation", Computer Animation, 2001. The Fourteenth Conference on Computer Animation Proceedings, Nov. 7-8, 2001, Piscataway, New Jersey pp. 184-191.

Claes, J et al., "Turning the approximating catmull-clark subdivision scheme into a locally interpolating surface modeling tool", Shape Modeling and Applications, SMI 2001 International Conference On., May 7-11, 2001, Piscataway, NJ, pp. 42-48.

European Search Report mailed Jun. 20, 2006, for European application No. EP 04257969 filed Dec. 20, 2004, 4 pages.

Feng, J. et al., "Multiresolution free-form deformation with subdivision surface of arbitrary topology", The Visual Computer, Jan. 31, 2006, vol. 22, No. 1, pp. 28-42.

Hua, J et al., "Free-Form Deformations Via Sketching and Manipulating Scalar Fields", Proceedings of the 8th ACM Symposium on Solid Modeling and Applications, Jun. 16-20, 2003, Seattle, WA, pp. 328-333.

Lee, S., "Interactive Multiresolution Editing of Arbitrary Meshes", Computer Graphics Forum, Amsterdam, Netherlands, Sep. 7, 1999, vol. 18, No. 3, pp. C73-C82, C402.

Milliron et al. (2002). "A Framework for Geometric Wraps and Deformations," ACM, 2(1): 20-51.

* cited by examiner

CHARACTER DEFORMATION PIPELINE FOR COMPUTER-GENERATED ANIMATION

CROSS-REFERENCE TO RELATED APPLICATIONS

This application is related to the following commonly owned and co-pending U.S. patent application, the disclosure of which is incorporated herein by reference:

U.S. patent application Ser. No. 10/769,154, entitled "Wrap Deformation Using Subdivision Surfaces," filed Jan. 29, 2004.

BACKGROUND OF THE INVENTION

1. Field of the Invention

The present invention relates generally to computer-generated graphics and animation, and more particularly to techniques for defining and establishing a deformation pipeline for use in computer animation.

2. Description of the Background Art

A central task in computer-generated (CG) animation is the construction of efficient and flexible deformations of three-dimensional (3D) characters in a way that satisfy the artistic demands of animators. When such deformations are provided with sufficient flexibility, animators are able to bring a higher degree of expressiveness to their 3D characters.

As the CG animation industry matures, new efforts are being made to make CG animation as expressive and free form as traditional hand-drawn animation. Since its inception, CG animation has often relied on the principles of robotics in order to describe motions, constraints and 3D boundary detection. This is philosophically very different to the silhouette-driven style of traditional two-dimensional (2D) hand-drawn animation. Bridging the gap between the lively and expressive 2D animation and more mechanical and constrained 3D techniques is an important goal of many CG animation studios.

Traditional hand-drawn animated characters come from the mind and hands of a traditional artist. By contrast, a CG character is generated from a model, or file, in a computer system that describes a collection of 3D surfaces in some mathematical form. CG artists use computer systems and animation software to create, edit and manipulate these 3D surfaces. CG animations are then created by animation software that deforms the original poses of the CG characters into an animated sequence over a number of frames. Digital artists control the poses of the CG characters at a number of frames using character rigs, which are conventionally provided as a collection of scripts, software subsystems and animation curves that specify the motions, timings and positions of the 3D character as a function of time.

CG characters, also known as models, are typically a collection of surfaces represented mathematically either as parametric surfaces (Bezier Patches, NURBS, Catmull-Clark, B-splines, etc.) or as high-resolution polygonal meshes. These methods for representing CG surfaces are well known in the industry. Parametric surfaces are made out of a number of control vertices (CVs), which together with an appropriate basis set describe the shape of a continuous and smooth 3D surface in space. Polygonal meshes, on the other hand, are generally a collection of points in space connected to each other to form a polyhedron; in general, polygonal meshes are more primitive than parametric surfaces. In the following description, the term "vertices" is used to refer generally to either CVs (e.g., of a parametric surface) or points.

Each of these representations has its advantages and disadvantages. In the CG film industry parametric surfaces are often preferred over polygonal meshes because the continuous properties of parametric surfaces tend to produce higher-quality images when rendered at high resolution. Polygonal meshes, on the other hand, are often preferred in the CG game industry because of their lightweight data representation and evaluation.

Polygonal meshes have free form topology; that is, the vertices in the mesh can connect with each other arbitrarily. On the other hand, traditional parametric surfaces such as NURBS (Non-Uniform Rational B-Splines) have a fixed topology in which vertices are interconnected in a quadrilateral array. Subdivision surfaces, like Catmull-Clark surfaces, offer a compromise between these two approaches, having the free form topology of polygonal meshes while still maintaining a local parametric representation and smoothness.

CG animation models are typically built using standard commercial software that allows digital artists to sculpt 3D objects in the computer. Conventional commercial packages for CG animation include products such as: Maya®, available from Alias Systems of Toronto, Canada; Studio Max, available from Discreet of Montreal, Canada; SoftImage, available from Avid Technology, Inc. of Tewksbury, Mass.; and LightWave 3D®, available from NewTek, Inc. of San Antonio, Tex.

Alternatively, some animators use traditional clay models as their starting points for CG characters. The clay is then scanned in 3D on the computer, imported into one of the commercial packages mentioned above and edited for corrections.

Construction of a character rig for animating models using conventional techniques tends to be labor-intensive, requiring a great deal of artistic experience in order to make the best use of the deformers available in the commercial package to drive the model in the desired manner. The design and development of the character rig are key factors in the overall quality of the resultant animation product, since the rig effectively determines the range of possible motions and deformations available to the animator.

A rig typically includes a skeleton system, including a set of CG joints that control the bending, torsion and deformation of the underlying structure of the character. The joints of the skeletons are controlled through animation curves created by the CG animator. A mathematical description is established for connections between skeleton joint locations and positions of vertices of surfaces in the CG model. For example, in one pose the skeleton of a humanoid rests in standing position and in another pose the skeleton sits in a chair. It is preferable to provide a mathematical description that drives the CG models to deform from the standing to sitting position smoothly as the skeleton switches positions. Most commercial packages provide a binding mechanism that links the positions of skeleton joints to the locations of vertices in the CG model. Each vertex moves according to a multi-linear combination of motions of nearby joints.

Weights can be provided to guide the multi-linear combination so that the motion of the surface is smooth. Conventionally, setting up the weights for the joints in the skeleton on a given character is a manual process that can be very labor-intensive. Moreover, the weighting of vertices for the skeleton binding is highly sensitive to changes of the structure of the surfaces on the CG character. Changes such as adding or removing a vertex on the surface, changing its parametric structure, or the like, generally void the work done on the binding weighting, forcing the individual to begin again.

In general, any significant editing changes on the CG model cause the weighting work done on the skeleton binding of a character to be voided. In addition, a character rig of a CG model cannot be easily transferred to another character that might be morphologically similar but different in terms of CG model (for example, having a different number of surfaces, number of vertices, alignment, or the like). Accordingly, character rigs generated by conventional software packages are not generic, meaning that they cannot be easily transferred from one CG model to another.

In addition, in film production the design of a character is often changed after a rig has been generated. Conventionally, most of the rigging work must then be discarded and a new rig restarted in order to adapt to these changes. What is needed, therefore, is a system and method for representing a character rig that is more independent from the specifics of any particular model. What is further needed is a system and method that provides CG animators with the ability to more effectively adapt to changes so as to provide significant cost savings. What is needed, therefore, is a system and method that allows technical directors to create generic rigs for animating whole families of characters, thus having applicability in crowd animations and simulations.

An additional challenge that exists in animation today is to bridge the gap between traditional (2D) and CG (3D) animation. Conventional systems are ill suited for such bridging, because of differences in character rigging style and also because of limitations in the layering of deformations (the way in which multiple deformers apply their effect onto the same surface of a CG model) offered by current commercially available and proprietary systems.

As discussed above, conventionally a skeleton binds to a CG model via a set of weighted multi-linear interpolations between joint positions and vertex initial locations. This binding normally takes care of the principal deformations of a CG model, such as for example the bending of an arm. However, typical CG characters for film are more complex, having numerous secondary motions taken care of by other deformers in the rig that superimpose their effects on top of the skeleton binding. For example, a deformer may be provided that bulges the bicep of the arm as it bends. Conventionally, such deformations are superimposed using any of a number of layering schemes such as sequential, parallel and/or blending. In a sequential layering scheme, the deformations are applied in the space of the post-deformed surface. In a parallel layering scheme, the deformations are applied simultaneously on the same pre-deformed space. In a blending layering scheme, a linear combination of the deformations is applied to the original pre-deformed surface.

Conventional implementations of these sequential, blending and parallel layering schemes are, in general, very diverse and difficult to unify into a single scheme. What is needed, therefore, is a character rigging system and method that provides a serialized representation of sequential, blending and parallel layering schemes. What is further needed is a system and method that is amenable to being divided and ported into a hardware API system.

Another significant limitation of conventional rig systems is an inability to provide a simple and model-independent way to create a hierarchical layering of deformations. A hierarchical layering is to one in which a later deformation is applied in the local space of the surface resulting from an earlier deformation. Hierarchical layering differs from sequential layering as follows. In a sequential layering scheme, the second deformation is applied in the global space of the surface deformed by the first deformation. For example the first deformer may bend a plane, while the second deformer grows a cone in a certain region of the bending plane. The cone always points in the same direction, no matter how the plane is bent. In a hierarchical deformation, the second deformation's effect are applied in the local space of each vertices deformed by the first deformation. Following the same example, then, in a hierarchical scheme a cone grown perpendicular to the surface of the plane would remain perpendicular to the plane regardless of how the first deformer changes the bending of the plane.

Hierarchical B-Splines are described, for example, in D. R. Forsey, R. H. Bartels AMC Transactions on Graphics Vol. 14 134-161 (1995). HB-Splines are parametric surfaces similar to B-Splines, except that the parametric domain in which they are defined can be redefined hierarchically with more detail where needed. By contrast, in a standard B-Spline, in order to increase the detail of the surface in a small region, one is forced to increase the resolution uniformly everywhere.

Hierarchical surfaces allow layering of deformations not only in the local space of the vertices, but also by scales. For example, a first deformer can create an overall squeeze and stretch deformation while a second deformation affects a small feature on a localized region of the surface, such as opening an eye. This hierarchical methodology for layering deformations and breaking up their scales is useful in making CG rigs more traditional-looking when animated.

For several reasons, existing hierarchical methodologies fall short of the actual CG production needs. Firstly, because the hierarchy is built in to the surface representation, hierarchical deformations do not generally work with surfaces such as polygonal meshes, NURBS, or Catmull-Clark surfaces. Secondly, hierarchical surfaces such as HB-Splines often fail to adapt satisfactorily to production changes. The parameter space is represented by a tree-like data structure, so that changes on the broad parametrization of the surface tend to invalidate the branches of the tree. For example, if a hierarchical surface is built as a horn extruded out of a sphere, then changing the underlying sphere form to open a mouth voids the work done on the horn. HB-Splines are also heavy structures that take a great deal of time to update.

What is needed, then, is a system and method that provides the advantages of hierarchically layered deformations without relying on a specially defined type of surface.

What is further needed is a rigging system and method capable of advanced layering methodologies, including hierarchical techniques, that can work with simple forms of CG models.

What is further needed is a technique for generating and manipulating generic, portable character rigs that avoid the limitations and disadvantages of prior art schemes.

What is further needed is a technique that allows digital artists to decouple the rigs used for the animation of computer-generated characters from the specifics of the models themselves What is further needed is a technique that improves flexibility so as to provide the potential for more expressive animated characters What is further needed is a technique that serializes complex deformations in order to improve performance and to facilitate hardware implementation.

SUMMARY OF THE INVENTION

The present invention provides a more flexible system for character deformation that allows digital artists to create more fluid deformations for their 3D characters, thus approximating the techniques available to 2D artists. According to the techniques of the present invention, a character deformation pipeline is established for CG animation, so as to address the above-described needs and to avoid the limitations of prior art schemes.

According to one embodiment, the invention is implemented using a data stream abstraction of one or more CG models. A serialized stack-like pipeline of modules is established; each module takes the data stream, deforms it, and passes it to the next module. This serialized architecture for the pipeline facilitates complex layering schemes that conventionally would require complex tree dependencies. The serialized architecture of the present invention unifies known layering schemes into a single implementation.

According to one embodiment, the present invention accepts CG models based on simple and common geometrical objects such as polygonal meshes, NURBS, B-Splines, subdivision surfaces, and the like, while supporting advanced layering deformation schemes for such objects.

The present invention thus provides a flexible deformation system that is resilient and able to adapt to the needs of actual CG production environments. The invention allows for changes in the CG model even after a character rig has been created, without invalidating the rigging work. Moreover the rig is generic in the sense that it can be easily ported between morphologically similar CG models.

Furthermore, the serialized architecture of the deformation pipeline of the present invention is capable of being implemented in hardware and/or via a stack based pipeline such as OpenGL.

According to one embodiment, CG models are abstracted into a data stream, referred to herein as a Deformation Data Stream (DDS). The DDS is capable of carrying information about the geometry of the surfaces of the CG model, as well as important items regarding the deformation environment of each of the vertices in the surface. Information on the deformation environment enables the building of layers of deformations in multiple spaces: pre-deformed, post-deformed, and/or local vertex frames of coordinates. The vertex environment information thus provides improved flexibility, since a user can generate deformations according to many different layering schemes without having to access data at earlier deformation stages.

In one embodiment, the DDS contains only geometrical information, that is, information regarding vertex locations and their deformation environments, and omits information indicating whether the vertices belong to a NURBS, a mesh or a subdivision surface. Thus, the deformation pipeline need not know about the "topology", the actual surface parameterization, in order to perform a deformation on the CG model. In some cases, however, where it is beneficial to provide deformers with a parametric representation of the surface containing a vertex, a second data abstraction containing topology descriptions of the surfaces in the CG model can also be used in the pipeline.

The DDS travels along a pipeline composed of a sequence of modules, each of which is assigned the task of applying a specific deformation on the data stream. As CG models travel through the pipeline's modules, the modules modify the models' vertices and deformation environments. Some of the modules contain CG skeletons, skinning bindings, secondary animation deformations, and the like.

In one embodiment, the modules of the present invention use dynamic binding algorithms, such as those presented in related U.S. patent application Ser. No. 10/769,154, entitled "Wrap Deformation Using Subdivision Surfaces". For example, in one embodiment a skeleton binds first to an intermediate object (referred to as a proxy model). The proxy model transfers deformations from the joints to the CG model's surfaces smoothly. Surfaces are bound to the proxy model dynamically, so that as the DDS enters a skin binding module it first finds an appropriate binding location on the proxy model; transformations are then applied according to the skeleton's joint movements. Should the surfaces in the DDS change on the fly, either because a similar character is being sent through the pipeline or because a change to the model has been made, the dynamic binding finds a new binding location on the proxy model. The relationship and setup of the CG skeleton to the proxy model are maintained, thus saving work by technical directors.

In one embodiment, each module in the pipeline has two inputs and two outputs, as follows:

a DDS input, including the stream of CG models prior to deformation;

a topology input, available for the module to use if needed;

a DDS output, including the stream of CG models after deformation, and a topology output, to be passed to the next module to use if needed.

Additional inputs and outputs may also be provided.

As will be apparent to one skilled in the art, the techniques of the present invention can be applied to skinning modules as well as to other types of deformers, such as for example wire deformers, polywraps, clusters, or the like.

According to the techniques of the present invention, deformation modules thus dynamically bind to the geometry in the DDS. Deformers apply their deformations according to any of four types of layering, or binding modes: sequential, blending, parallel or hierarchical. Depending on the selected binding modes, the module binds and deforms the vertex information in the DDS differently, as is described in more detail below.

In a sequential binding mode, each deformer layers its deformation on top of the previously deformed surface. These deformations are applied using a global system of coordinates.

In a blending binding mode, each deformer binds to the original, pre-deformation geometry. The DDS contains the original vertex position in its description. Each deformer, after applying its deformation, uses a scalar parameter to blend (interpolate) its effect with the deformed geometry in the DDS input, thus adding its effect to the prior sequence of deformations. The blending binding mode allows a user to tune in or out the effect of a particular deformation within a chain of deformers.

In a parallel binding mode, each deformer binds to the original, pre-deformation geometry, and adds its own contribution to the DDS by vector addition (as opposed to linear interpolation).

In a hierarchical binding mode, rather than binding directly to vertices, each deformer binds to local centers of coordinates for those vertices (these are referred to herein as binding frames). Each vertex in the DDS has an associated local frame of coordinates. This frame of coordinates is part of the deformation environment for the vertex that can be carried by the DDS. By facilitating deformations about the local frames of coordinates, the present invention opens possibilities for increasingly sophisticated deformations that pivot vertices about their anchor points, particularly since each vertex in the DDS can have a different local frame of coordinates.

The features and advantages described in this summary and the following detailed description are not all-inclusive. Many additional features and advantages will be apparent to one of ordinary skill in the art in view of the drawings, specification, and claims hereof.

Moreover, it should be noted that the language used in this disclosure has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 10D depicts an example of a data stream item in hierarchical binding mode, according to one embodiment of the present invention

The Figures depict a preferred embodiment of the present invention for purposes of illustration only. One skilled in the art will readily recognize from the following discussion that alternative embodiments of the structures and methods illustrated herein may be employed without departing from the principles of the invention described herein

DETAILED DESCRIPTION

The term "surface" as used herein refers to surface representations such as NURBS, polygons, curves, subdivisions, and the like, and can also include streams of particles with positions, velocities and accelerations. In general, any point data carrying user-defined scalars and/or fields can be considered "geometry" within the context of the present disclosure, and can be deformed by the techniques of the present invention.

The techniques described herein are independent of the particular topology, or point connectivity information, of the geometry or object being deformed. For illustrative purposes, the following description makes references to animated characters as the object being deformed; however, one skilled in the art will recognize that the techniques described herein can be applied to other types of geometries and objects.

Figure 1:
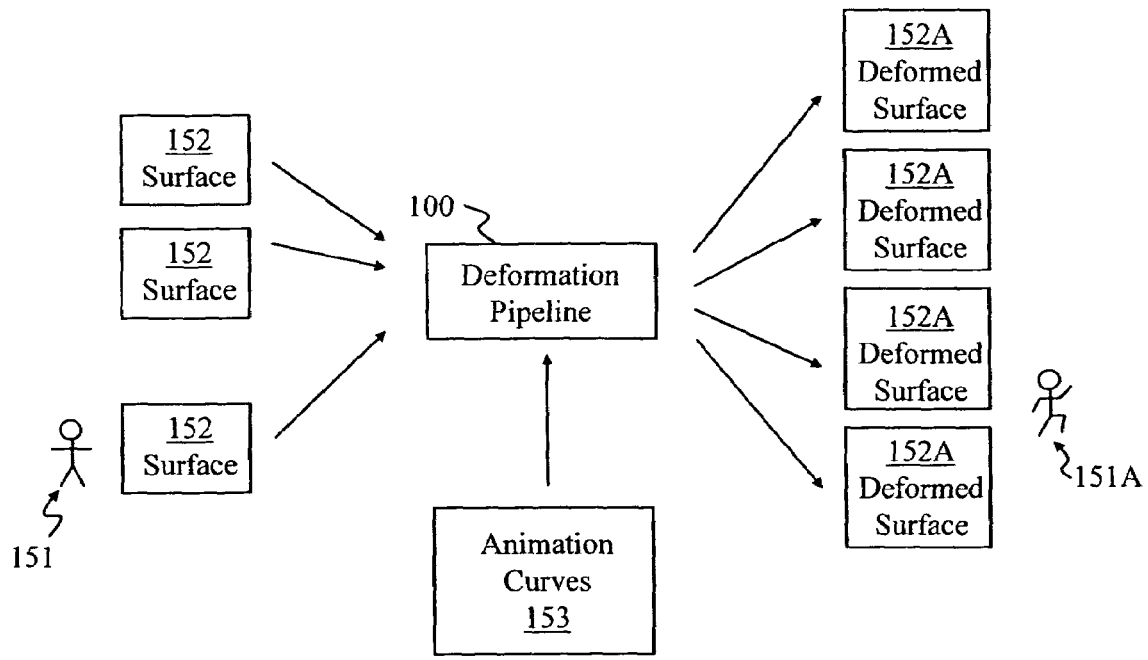
FIG. 1 is a block diagram depicting the flow of a CG model's geometry through a deformation pipeline according to one embodiment of the present invention.

Referring now to FIG. 1, there is shown a block diagram depicting the flow of a CG model's 151 geometry through a deformation pipeline 100 according to one embodiment of the present invention. CG model 151 includes a number of three-dimensional (3D) surfaces 152. As model 151 passes through pipeline 100, it gets transformed into an animated model 151A representing a character. Deformation pipeline 100 takes as input surfaces 152 of CG model 151 as well as corresponding animation curves 153. Each animation curve 153 describes, as a function of time (film frame), the position of various controls in the CG character rig. Deformers (not shown in FIG. 1) within deformation pipeline 100 use animation curves 153 to create deformations on surfaces 152. After all these deformations have been evaluated, deformation pipeline 100 outputs final deformed surfaces 152A in the animated position. In one embodiment, deformation pipeline 100 is executed for every time frame in order to produce a sequence of animated poses.

Figure 2:
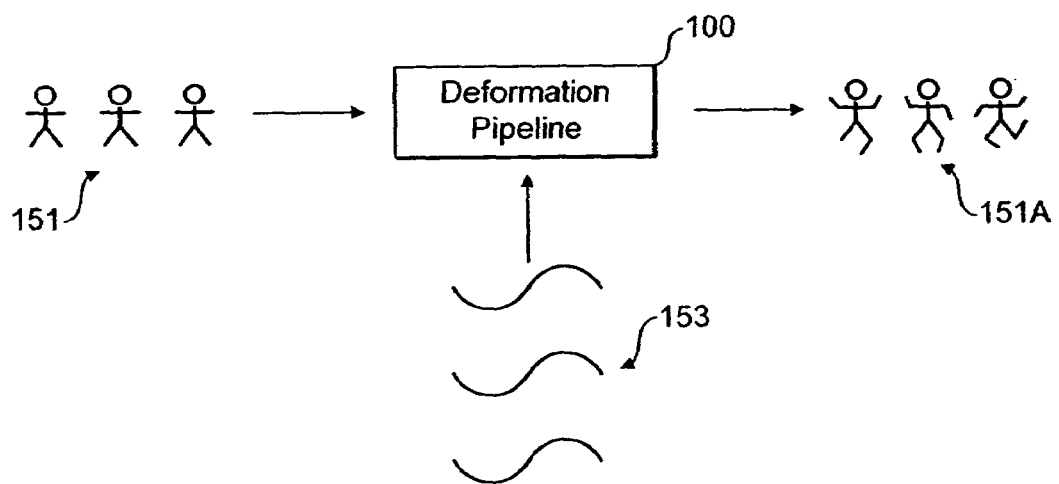
FIG. 2 is a block diagram depicting a pipeline for animating a series of humanoid characters, according to one embodiment of the present invention.

Referring now to FIG. 2, there is shown a block diagram depicting an example of using pipeline 100 to animate a series of humanoid characters, represented by models 151, according to one embodiment of the present invention. Input to pipeline 100 includes a sequence of characters, represented by models 151, as well as a sequence of animation curves 153. The characters are morphologically similar so that the same deformation pipeline 100 can be applied to all characters. Each character corresponds to an animation curve 153. Pipeline 100 generates output including the original set of characters deformed in animated poses. In one embodiment, for each value of the animation curves, deformation pipeline 100 creates a character animation pose for the given time frame.

Figure 3:
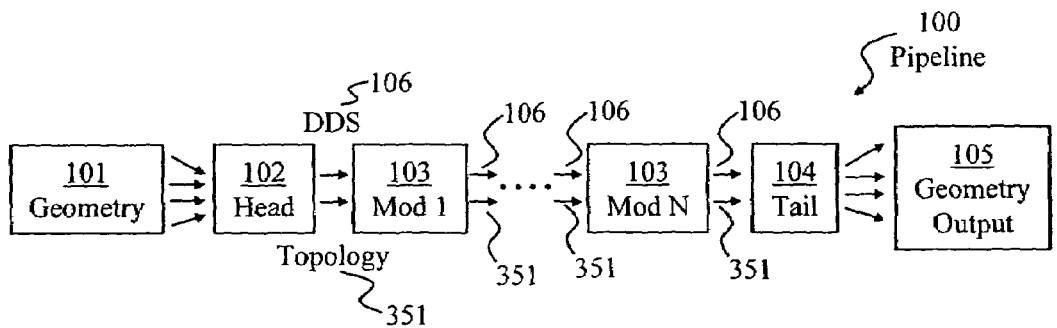
FIG. 3 is a block diagram depicting a layout of modules in a deformation pipeline, according to one embodiment of the present invention.

Referring now to FIG. 3, there is shown an example of deformation pipeline 100 according to one embodiment. Pipeline 100 includes a sequence of modules 102, or deformers, each one accepting a deformation data stream (DDS 106) and a topology 351. Each module 102 outputs a DDS 106 and a topology 351. Each module 102 creates a deformation in the geometry stored in DDS 106. Also provided are head module 102, which converts geometry 101 of the character(s) into DDS 106, and tail module 104, which combines deformed DDS 106 and topology 351 back together into a geometry output 105.

Figure 4:
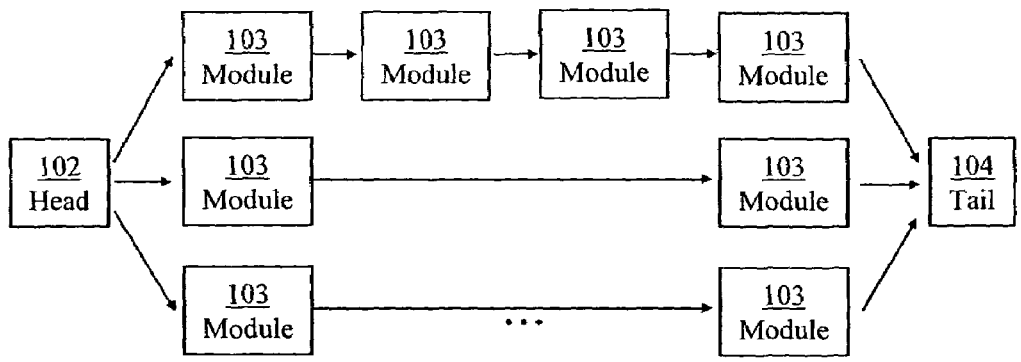
FIG. 4 is a block diagram depicting an alternative layout of modules in a deformation pipeline including branching and merging of deformations, according to one embodiment of the present invention.

Now referring to FIG. 4, there is shown an alternative layout of modules 103 in deformation pipeline 100 including branching and merging of deformations, according to one embodiment of the present invention. Multiple sequences of deformation modules 103 take DDS 106 from head module 102 and transform it in parallel and independently until DDS 106 reaches tail module 104 for its final recombination. In the parallel layout of FIG. 4, the tail module 104 combines the various DDS's 106 linearly with corresponding weights. Thus, the user can specify that more importance should be placed on one sequence of deformations over another.

In one embodiment, not all modules 103 in pipeline 100 create a deformation on DDS 106. Some modules 103 may only affect vertex information on DDS 106, or may filter DDS 106 to exclude a geometry from further processing. Such behaviors are described in more detail below.

In one embodiment, each module 102 is an independent entity that can be duplicated and placed anywhere in pipeline 100. In addition, pipeline 100 can be described as a graph, and can be implemented using well known techniques of graph theory, such as for example a dependency graph as found in Maya®. One skilled in the art will recognize that any other dependency graph system can also be used.

Figure 5:
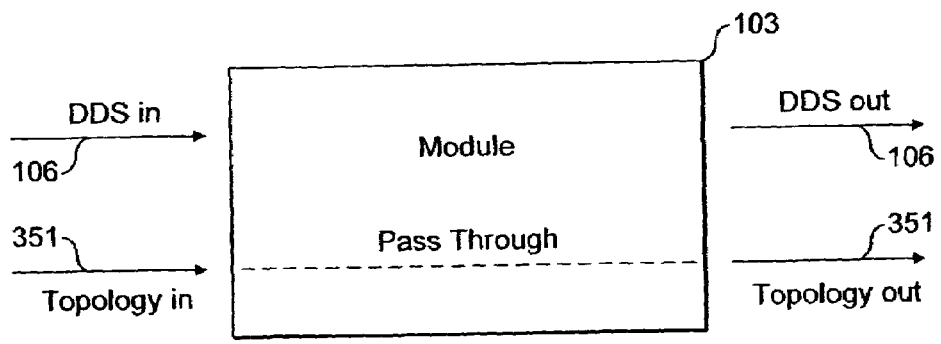
FIG. 5 is a block diagram depicting a deformation module, according to one embodiment.

Referring now to FIG. 5, there is shown a block diagram depicting a deformation module 102, according to one embodiment. Module 102 functions as an independent unit that takes as input DDS 106, performs a number of filtering and/or deformation operations, and then passes transformed DDS 106 as output. The deformation performed on the geometry in stream 106 is completely encapsulated in module 103. Module 103 need not have any access to any data structures other than DDS 106 topology 351. Similarly, any client object of module 103 need not have access to any data structures other than DDS 106 and topology 351 outputs.

In one embodiment, topology 351 is provided as a data structure containing information describing the topological makeup of the geometry encoded in DDS 106. In one embodiment, topology 351 is a constant structure that module 103 reads and passes through to the next module 103. Thus, module 103 does not perform any modifications to topology 351. When module 103 detects an update in DDS 106 input or topology 351 input, it triggers a new evaluation. The new evaluation in turn leads to computation of a new deformation on DDS 106 input; as a result DDS 106 output is recomputed and sent to the output attribute of module 103.

In one embodiment, pipeline 100 is implemented in a hardware graphics card specialized in the deformation of CG characters for animation and games. An example of such an implementation makes use of an OpenGL graphics card using a vertex pipeline of stacked operations, wherein the stacked operations are DDS 106 operations. As depicted in the pipeline 100 architecture of FIG. 3, the deformation change is implemented as a stack of operations happening sequentially on a DDS 106 data structure. In the hardware implementation, the hardware card uses an underlying implementation as described above with respect to FIG. 3; a software developer creates calls to the modules of the hardware card after providing some basic setup commands. Once hardware implemented modules are initialized, a user of this application can interact with the system as described above with respect to FIG. 2, by sending one or more CG models 151 and their respective animation characters so that the hardware can execute the deformation modules 103 returned the animated CG model.

Deformation Data Stream (DDS) 106

According to one embodiment of the invention, the deformed geometry is represented as a deformation data stream (DDS) 106. The data stream format facilitates a serialized implementation of deformation pipeline 100 that can support layering schemes for deformation. In addition, the serialized implementation is amenable to hardware implementation, in some embodiments.

Figure 6:
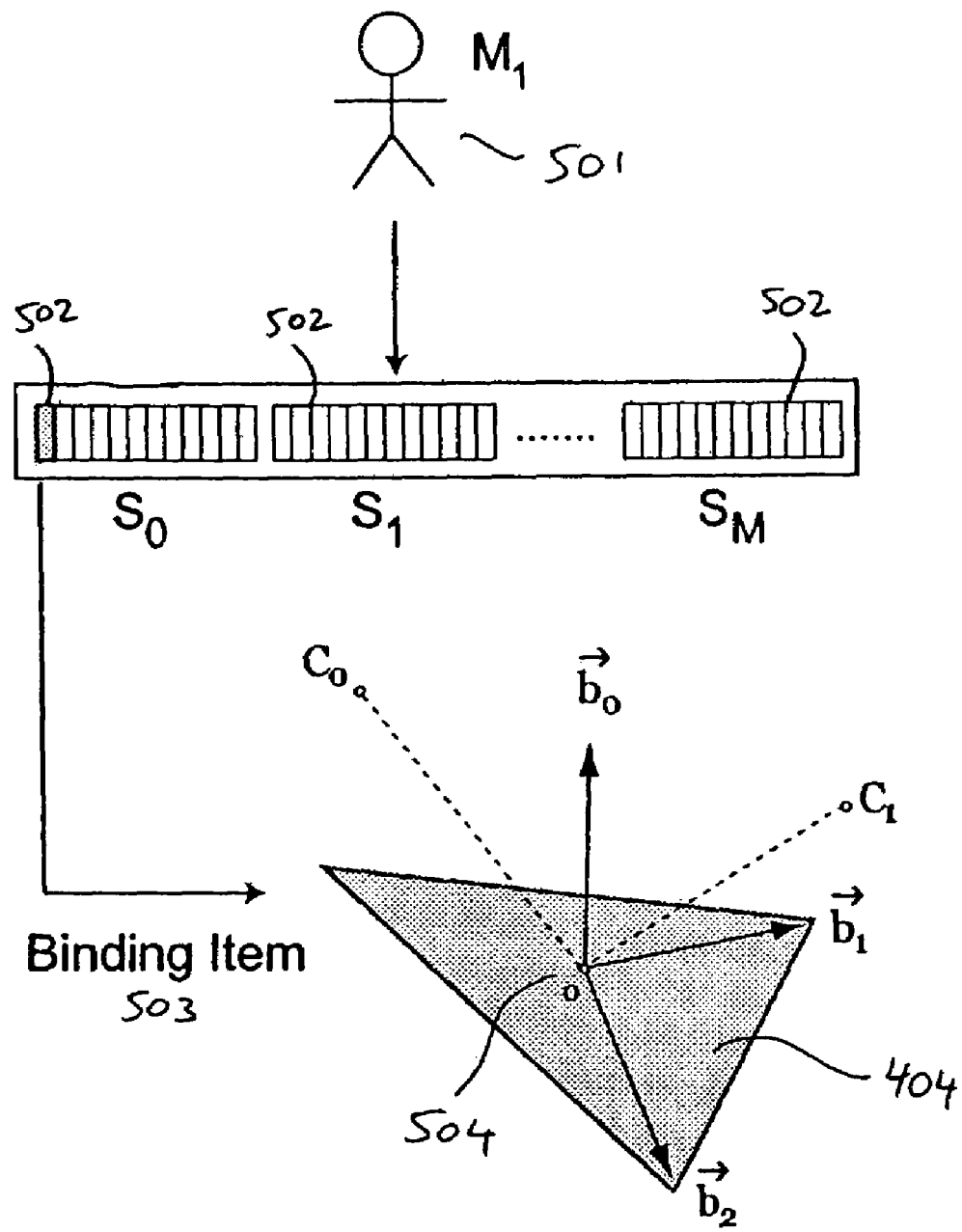
FIG. 6 depicts a methodology for representing a character as an element of a deformation data stream, according to one embodiment.

Referring now to FIG. 6, there is shown a methodology for representing a character 501 as an element of data stream 106 for deformation pipeline 100. Character $M_1$ 501 includes a number of discrete surfaces, denoted as $S_0$, $S_1, \ldots, S_M$, each corresponding to a block 502 of binding items 503. Each binding item 503 contains a corresponding vertex position as well as relevant vertex environment information for layering sequential, hierarchical, and other deformations. Surfaces $S_i$ of the character are each encoded as a block 502 of binding items 503. In one embodiment, each binding item 503 is a data object of the following form, shown for illustrative purposes in the C++ programming language:

```
class BindingItem {
    private:
        int tag;
        Point cvOrig;
        Point cvCurrent;
        Point cvProjection;
        FrameItem bindingSite;
        . . . .
};
``` where:

```
class FrameItem {
    private:
        int ID;
        Point orig;
        Vector basis[3];
        double weight;
        . . . .
}
```

In one embodiment, the following objects are provided in the bindingItem structure:

Tag t (BindingItem::tag) identifying the vertex within the surface of the object.

Original vertex location $C_0$ (BindingItem::cvOrig) containing the original location of the vertex prior to any deformation by pipeline 100. In one embodiment, the coordinates of this vertex location are written in a local frame of coordinates specified by {O; b0, b1, b2} (BindingItem::bindingSite).

For each vertex in block 502 for surface $S_i$, a local bindingSite, or frame of coordinates. When DDS 106 is first created by head module 102, all vertices normally have the same local frame of coordinates (the object space system of coordinates). However, as DDS 106 streams through modules 103, these local frames of coordinates may get transformed, as described below, and may therefore be different even among vertices on the same surface.

Projection vector α (BindingItem::cvProjection), which generally contains components on the {b0, b1, b2} basis set, describing the post-deformed position of the vertex. Each module 103 predicts a different deformation; according to the binding mode, the actual vertex coordinates that are being deformed changes, so that it is not necessarily $C_0$. Each module 103 stores in vector a the components of that deformation in the local frame of coordinates.

$C_1$ (BindingItem::cvCurrent), containing the final post-deformed position of the vertex. This may be different than the position predicted by a because it includes weighting, blending equations and any other post-deformation algorithm the developer of module 103 may wish to apply.

In one embodiment, the FrameItem vertex binding site data structure includes the following:

ID (FrameItem::ID) represents an integer identifier for the frame of coordinates, or bindingSite. This frame of coordinates can be computed and deformed externally in other structures, as will be described in more detail below.

O (FrameItem::orig) represents the origin for the local frame of coordinates or binding site. All other vectors in binding item 503 are referred to this origin. Hence deformation modules that manipulate the coordinates of the origin can create many different hierarchical effects on the surface vertices without affecting the relative offsets and orientations with respect to O.

The basis set of the local frame $b_0$, $b_1$, $b_2$ (FrameItem::basis[3]) describes the per-vertex system of coordinates where deformations get stored and, in some cases, evaluated. The deformation pipeline of the present invention does not necessarily require an orthogonal system of coordinates. In fact in the Cbinding module, described in related U.S. patent application Ser. No. 10/769,154, entitled "Wrap Deformation Using Subdivision Surfaces", the vectors $b_1$, $b_2$ are not necessarily orthogonal in order to describe local shearing deformations of the vertex binding while $b_0$ is orthogonal to them.

Each local frame has a weight ω (FrameItem::weight) through which modules can take user input as to how much of the full deformation to apply per vertex. When the weight value is 0, no deformation is applied. When the weight value is 1, a full deformation is applied. Values between 0 and 1 result in generation of an interpolation between the fully deformed and undeformed vertex positions.

For purposes of the description provided herein, the term "point" is used to describe an object representing a vertex or origin. However, one skilled in the art will recognize that invention is not restricted to points in a three-dimensional (x, y, z) Euclidean space. Thus, the term "point" as used herein shall be considered to refer to other features such as velocities (for example for a deformation pipeline of particles in an effects engine) or accelerations (for example in a dynamics application such as clothing simulation).

Deformation modules 103 can use binding Items 503 in various ways. A module 103 can focus on the original vertex location (cvOrig) to create a new deformation based on the original undeformed surface, or it can ignore the original vertex location and use the current vertex location (cvCurrent) to continue further deformation of the surface, or it can modify projection α and/or bindingSite to affect the local frame of coordinates. As will be apparent to one skilled in the art, the present invention facilitates a large number of deformation possibilities using a binding item 503 object.

In one embodiment, if the surfaces of CG model 151 are not static, so that their vertices change over time, then the updates on the surface vertices flow through the cvOrig item in the BindingItem data structure of DDS 106. As a result, deformations set up for the character at a given pose are layered on top of the moving CG model 151 animation. One example of such a situation is a CG model 151 that is actually an externally driven blendshape deformation, wherein pipeline 100 controls secondary movements on model 151.

Thus, the present invention is well adapted to handle a mix of several types of deformation pipelines 100 that may be directed toward various specific tasks.

Proxy/Surface Binding Model

As can be seen from the above description, the present invention supports sophisticated deformation layering schemes while maintaining a serialized architecture in pipeline 100.

In one embodiment, the present invention also provides support for keeping deformation modules 103 independent from the specifics of the surfaces of CG model 151. Deformation pipeline 100 can thereby adapt dynamically to changes in the specifics of CG model 151. For example, referring again to FIG. 1, in one embodiment pipeline 100 is independent of the specific topological details of the surfaces in CG model 151 and of the number of surfaces. Pipeline 100, in one embodiment, is also independent of minor changes in the shape of CG model 151. Thus, artists using pipeline 100 of the present invention can repeatedly reuse the same pipeline 100 build for a certain type of character, through the life of the character during the course of production. In addition, the same pipeline 100 can be used with multiple characters having the same morphological structure.

Related U.S. patent application Ser. No. 10/769,154, entitled "Wrap Deformation Using Subdivision Surfaces", described a technique for wrap deforming arbitrary types of geometry using subdivision surfaces. Wrap deformation is a technique for defoirning a geometry surface by using an auxiliary surface that "wraps" around the first. Generally the wrap surface is less detailed and resolved, and it is not uncommon to use polygonal meshes as wrap surfaces for this type of deformation.

In one embodiment of the invention, the character rig is decoupled from the actual CG model 151 by using deformation modules 103 that implement a "Proxy/Surface Binding" model. In the case of a skinning deformation, which connects skeleton joints to a CG model 151, a proxy model (generally a rough polygonal mesh representing the CG model) is included in the deformation module 103, to which the skeleton joints bind directly. This proxy model then uses an algorithm, as described in the related U.S. patent application, to generate a number of local frames of coordinates where the vertices of the CG model 151 bind.

Figure 7A:
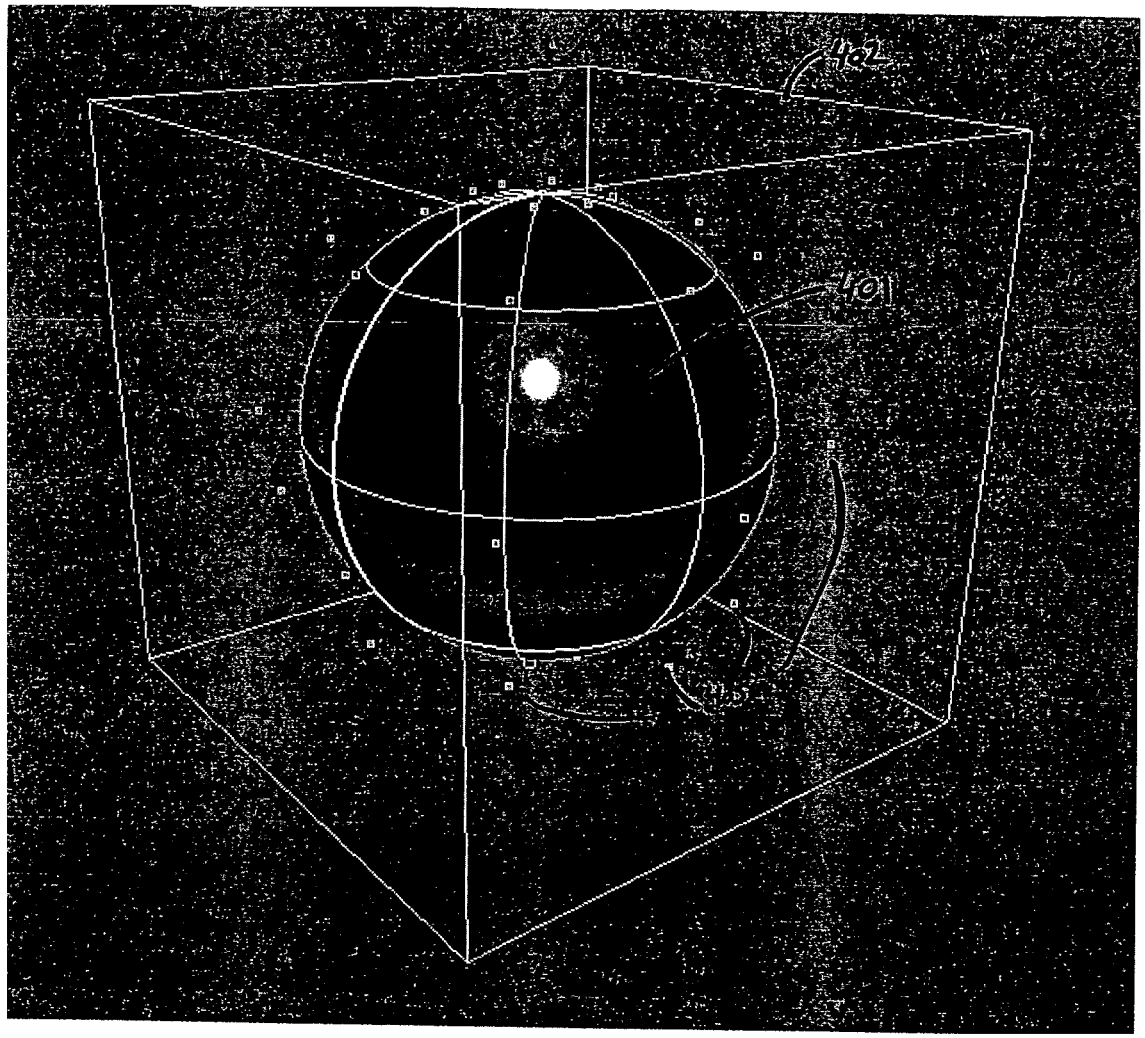
FIG. 7A through 7D depict an example of a NURBS sphere bound to a cube polygonal mesh, according to one embodiment.
Figure 7B:
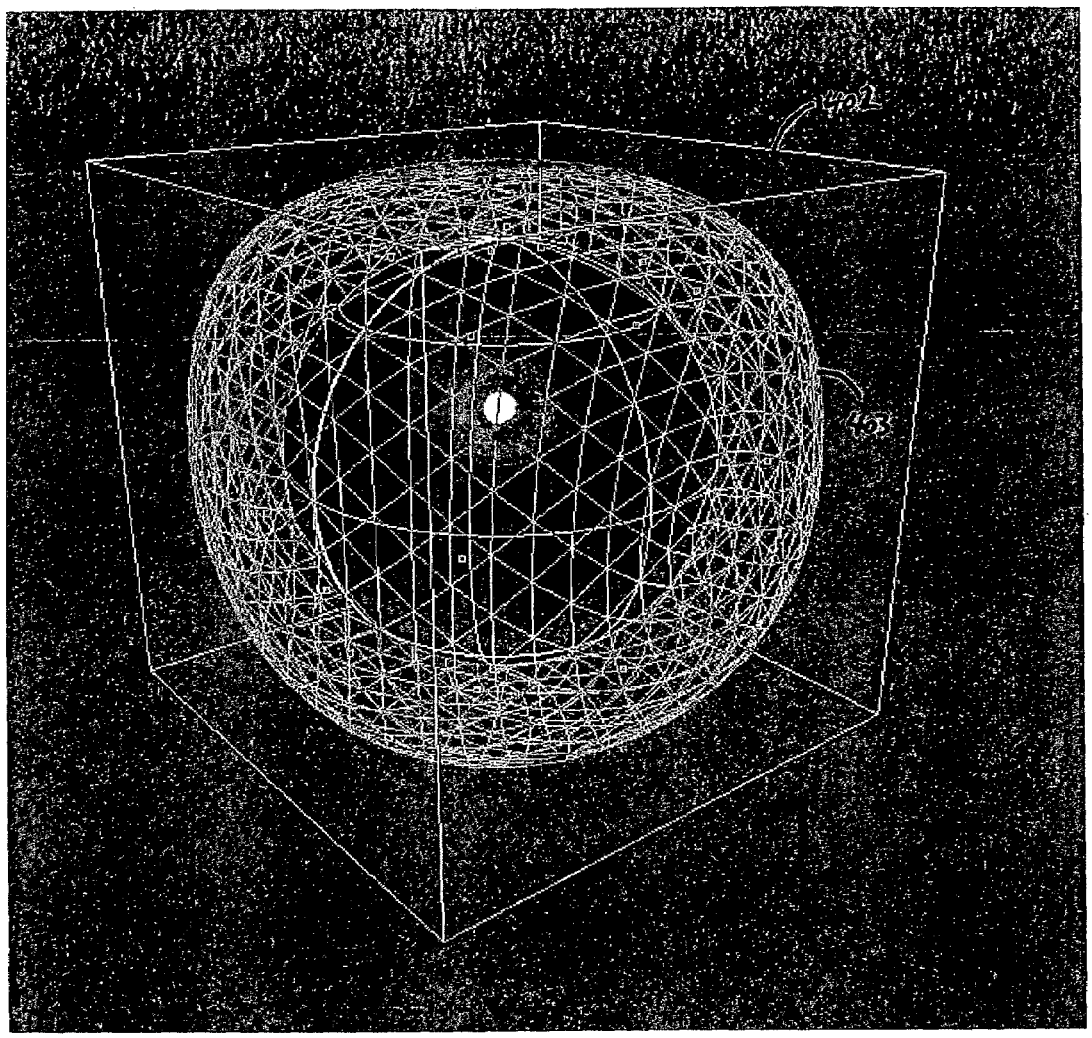

Referring now to FIG. 7A through 7D there is shown an example of a CG model (NURBS sphere 401) and a proxy model (cube polygonal mesh 402). As shown in FIG. 7A, proxy model 402 wraps sphere 401 (vertices 405 of sphere 401 are highlighted for clarity). FIG. 7B shows corresponding binding surface 403 between the proxy model 402 and sphere 401. In this example, binding surface 403 is computed as a Loop subdivision surface associated with the proxy polygonal mesh 402, as described in more detail in the related U.S. patent application. Accordingly, any changes to the vertices of cube 402 transform into smooth and continuous changes on binding surface 403. As is well known in the art, a Loop subdivision surface is a triangle-based surface of finite resolution which has a parametric representation at least locally.

Figure 7C:
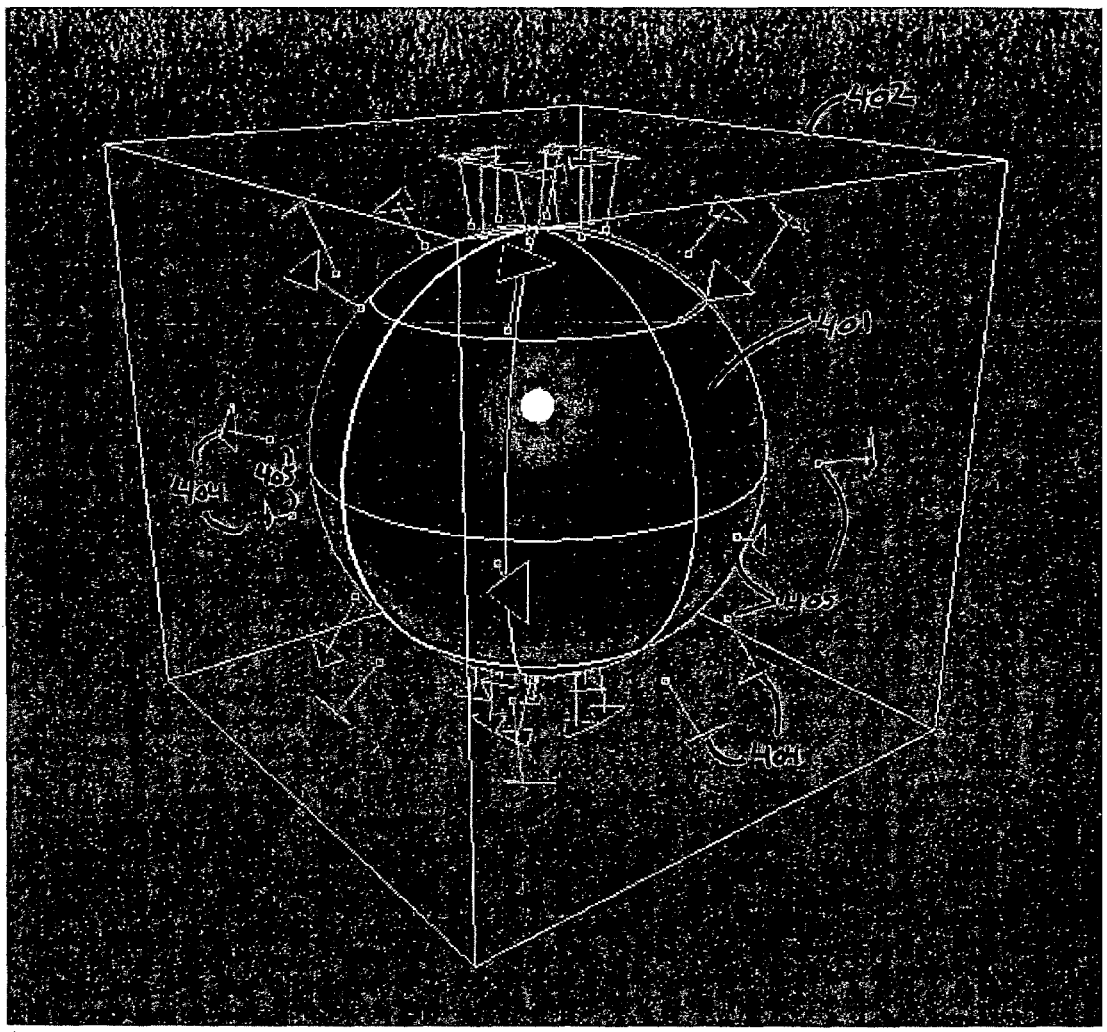
Figure 7D:
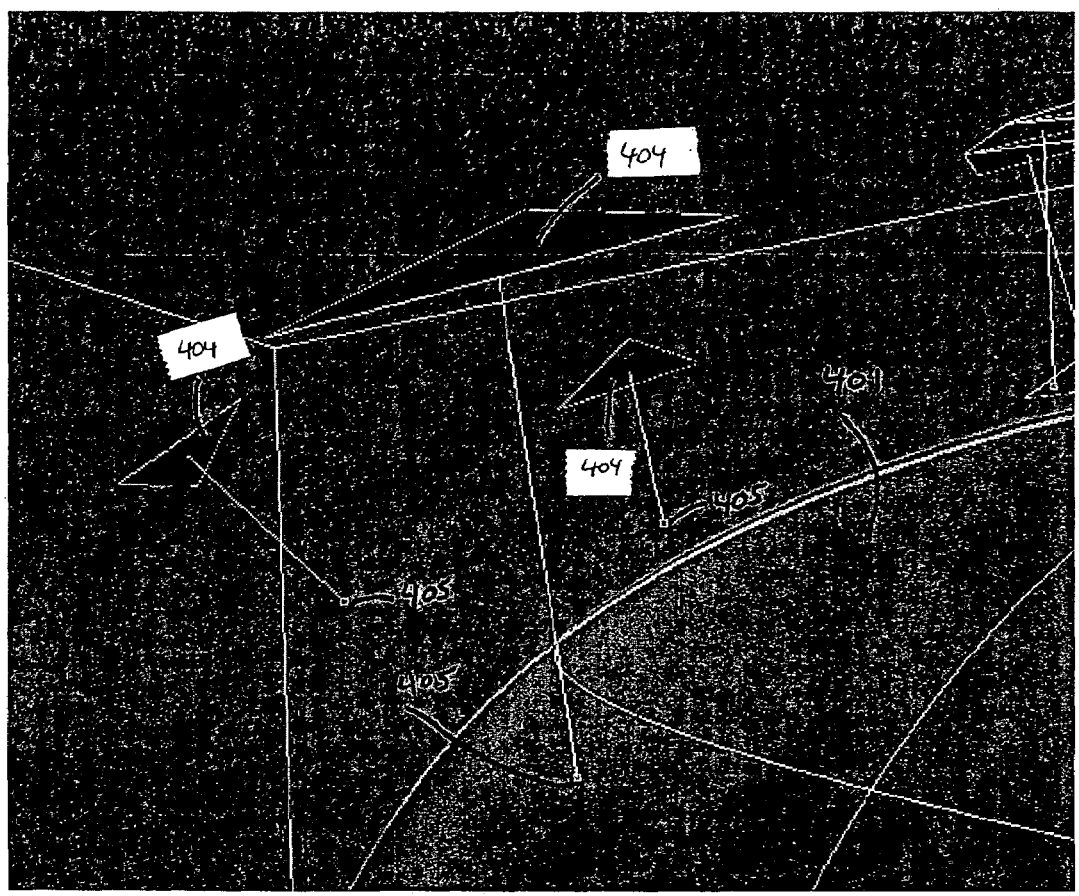

As depicted in FIG. 7C, each vertex 405 on sphere 401 associates, or binds, to the closest triangle 404 on binding surface 403. Appropriate offsets and frame of coordinates are calculated in these binding operations. Referring now to FIG. 7D, there is shown a detail view of three such bindings between sphere vertices 405 and triangles 404 on binding surface 403. Any deformation of the cube polygonal mesh 402 triggers an update of binding surface 403 via the Loop subdivision algorithm, which in turn propagates through the binding interface to vertices 405 on sphere 401 (the actual CG model).

Using these techniques, a proxy model 402 of the CG character is used to deform a CG model. Thus, the wrap deformation algorithm allows for a great amount of local control of deformations. In addition, a CG skeleton can be bound to proxy model 402, so that the skeleton joints deform the CG model indirectly by a binding surface mechanism. An advantage of this extra level of indirection is that the skeleton/proxy rig combination, once set up and weighted, can re-bind to multiple forms of CG models without having to significantly modify the work done on the rig.

One skilled in the art will recognize that the described algorithm is just one of many possible proxy/surface binding algorithms that can be used in pipeline 100 of the present invention. In some embodiments, the present invention provides modules for proxy binding to polygonal meshes, parametric curves, NURBS surfaces, systems of particles, and the like. Similar modules can be developed for other types of proxy objects.

Figure 8:
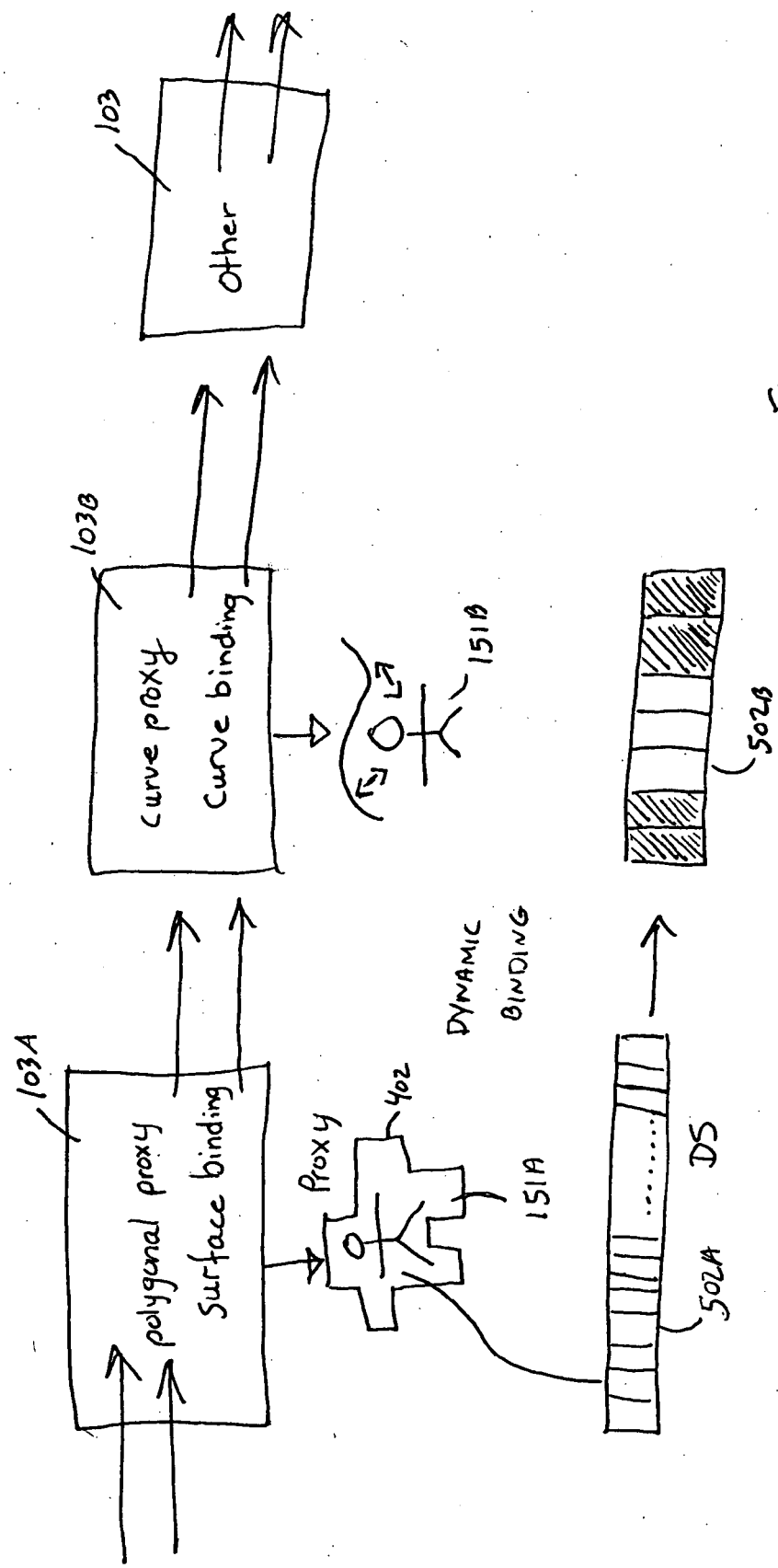
FIG. 8 depicts a sample portion of a deformation pipeline including two proxy/surface binding modules.

Referring now to FIG. 8, there is shown a sample portion of a deformation pipeline 100 including two proxy/surface binding modules 103A, 103B. Module 103A is a polygonal mesh proxy/surface binding; module 103B is a parametric curve proxy/curve binding. Also shown are blocks 502A, 502B, representing items in DDS 106 associated with a CG model 151A, 151B. When a DDS 106 item enters module 103A, it binds dynamically to the proxy polygonal mesh 402. Existing deformations on the proxy model 402 then transfer to the vertices in DDS 106 Binding items 503 and stream 106 moves on to the next deformation module 103B. As DDS 106 passes through curve proxy/curve binding module 103B, DDS 106 item follows a similar process by which its BindingItems find a binding point on the binding curve of the parametric curve and get new coordinate positions for the surfaces on CG model 502 from deformation module 103B.

Binding surfaces and binding curves can be created from proxy objects according to any of a number of techniques. If the proxy object 402 is a polygonal mesh, modules are provided that use Catmull-Clark and Loop subdivision surfaces to generate local binding surfaces. Each polygon in the subdivision surface has a local frame of coordinates defined by the tangent vectors on the limit subdivision surface for the given vertex of the subdivision surface. The finite resolution of the subdivision surfaces is controlled by parameters on deformation modules 103, thus allowing users to adjust for large changes of resolution between proxies 402 and CG models 151. In the case of NURBS proxies 402, the convex hull can be used to define a polygonal mesh; surface binding is computed using the techniques described above. When proxy object 402 is a parametric curve, module 103 samples the curve at a given rate to obtain a sequence of local frames of coordinates. In order to fully describe a three-dimensional frame of coordinates along the curve, a differential scheme such as the Frenet or Bishop frames of coordinates is used. Alternatively, module 103 may resort to two curves: one specifying the location of the curve prior to the deformation and the other specifying the location of the curve after the deformation.

As described above, the surfaces 152 of a CG character are transformed into blocks of Binding items 503 on DDS 106. Among the data contained in binding items 503 is the bindingSite, a local frame of coordinates for the surface vertex. Inside each module 103 where a proxy binding occurs, the bindingSite for each of the vertices gets replaced by the corresponding surface binding frame of coordinates. For example, referring again to FIG. 7D, each vertex 405 of sphere 401 is bound by a nearest neighbor algorithm to a triangle 404 in binding surface 403 of the Loop subdivision. Each triangle 404 has a well-defined frame of coordinates, where the origin is the barycenter; two of the three basis vectors point from the barycenter to two non-degenerate triangle vertices, while the third basis vector is normal to the plane of triangle 404. Then, triangle's 404 barycenter replaces the bindingSite.orig variable. The local frame of coordinates of triangle 404 replaces the vector's bindingSite.basis[3], and if there is a weighting value associated with triangle 404 for use during the deformation algorithm, that weighting value is assigned to bindingSite.weight.

Figure 9A:
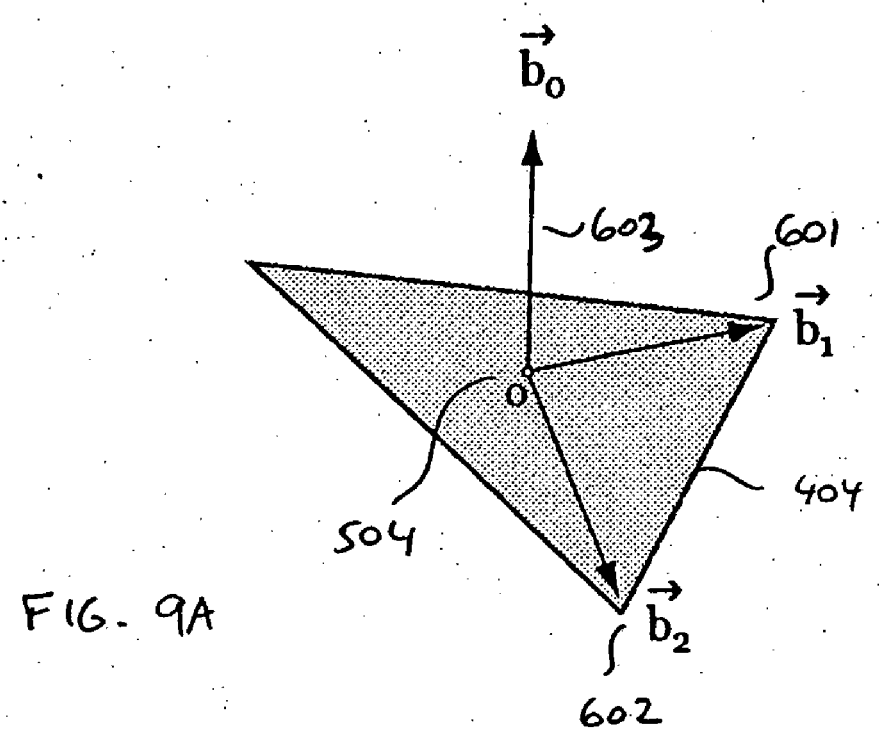
FIGS. 9A and 9B depict an example of triangular binding, shown before and after a deformation.
Figure 9B:
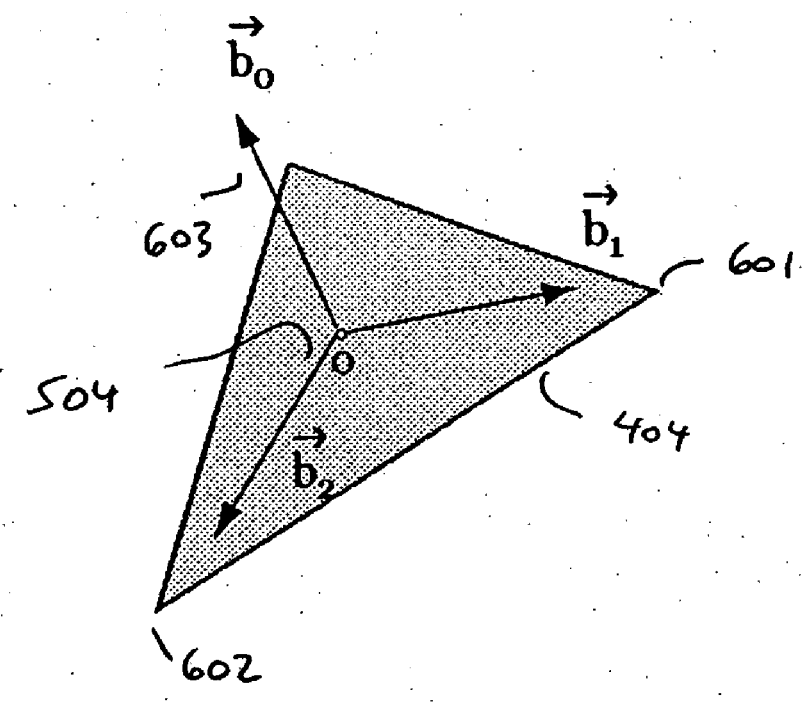

Referring to FIG. 9A there is shown a local frame of coordinates for a triangle 404 in a Loop subdivision surface prior to any deformations on the proxy polygonal mesh 402. FIG. 9B depicts triangle 404 after proxy polygonal mesh 402 has been modified. Barycenter 504 changes position, and basis set b0, b1 and b2 603, 601, 602 point to different locations. During the proxy deformation, the cvProjection components remain constant while the local frame of coordinates changes; as a result, a new location is predicted. In one embodiment, the cvProjection components are calculated by caching in deformation module 103 the surface binding properties prior to any changes in proxy model 402. In general, these properties remain constant unless the user triggers a surface rebind event, causing a new surface binding to be cached by module 103. Thus, in this embodiment of the invention, each module 103 contains two copies of the proxy binding surface: a static version for computing cvProjection components, and a dynamic version for updating the local frames of coordinates in binding items 503 of DDS 106.

After passing through deformation module 103, each of the vertices in DDS 106 item has a new frame of coordinates where the deformation of module 103 was applied locally. Downstream modules 103 are free to replace or create hierarchical deformations based on this frame of coordinates. Furthermore, the deformation performed by module 103 is stored in the local frame of coordinates in BindingItem::cvProjection. This data is not necessarily the same as the position of the vertex after the module deformations have been completed (BindingItem::cvCurrent) because it does not take into account any post-deformation weighting or interpolation algorithms.

The above-described examples assume that proxy model 402 is set up as a wrap-deforming object that drags vertices of CG model 151. One skilled in the art will recognize, however, that other configurations are possible. For example, proxy polygonal meshes 402 can be placed inside CG models 151 to work as supporting surfaces for deforming the characters. Such an arrangement may be preferable in some situations, for example to generate anatomically precise deformations. For purposes of the description herein, the term "wrap deformation" is used regardless of the placement of proxy 402 relative to CG model 151.

Deformation Layering Schemes

Once a binding relationship between proxy 402 and CG model 151 has been established, one can define a number of layering schemes for deforming surfaces 152.

As described above, deformation modules 103 support several different layering schemes, including parallel, blending, sequential and hierarchical. In one embodiment, these deformation schemes are supported by the DDS 106 design as follows.

Once a binding between an element of the proxy surface or curve and binding item 503 in DDS 106 item has been established, a determination is made as to how module's 103 algorithmic deformation is applied to compute a new vertex position. In one embodiment, proxy 402 binds to either $C_0$ (initial vertex position), $C_1$ (current vertex position, also known as pre-deformed position) or O (origin for an input local frame of coordinates).

Figure 10A:
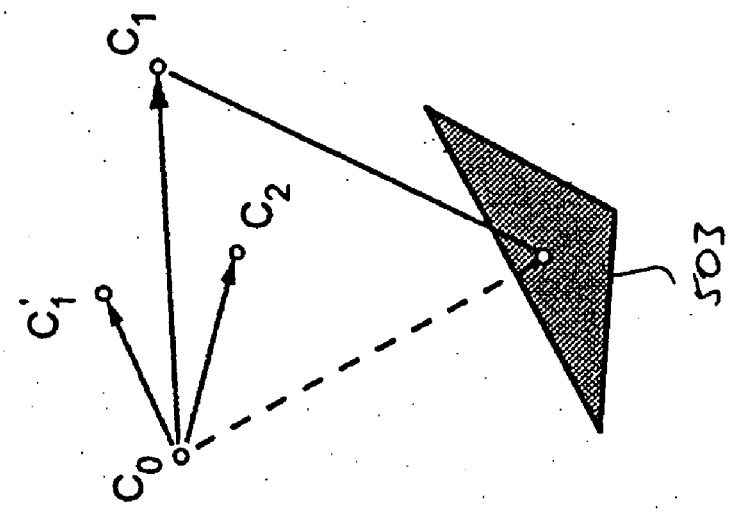
FIG. 10A depicts an example of a data stream item in parallel binding mode, according to one embodiment of the present invention.
Figure 10A:
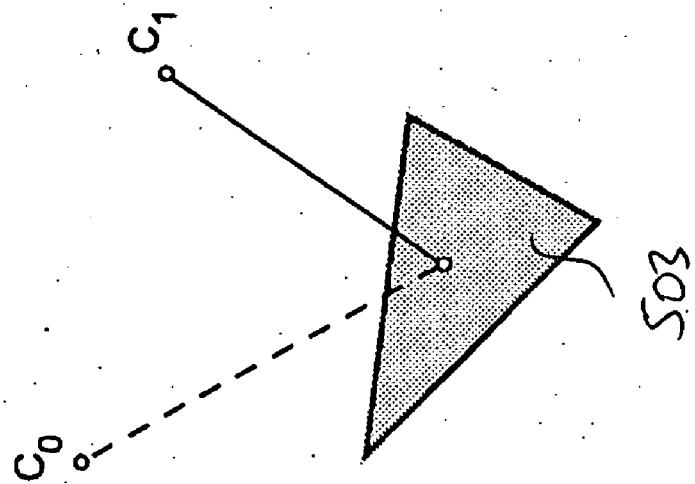
Figure 10B:
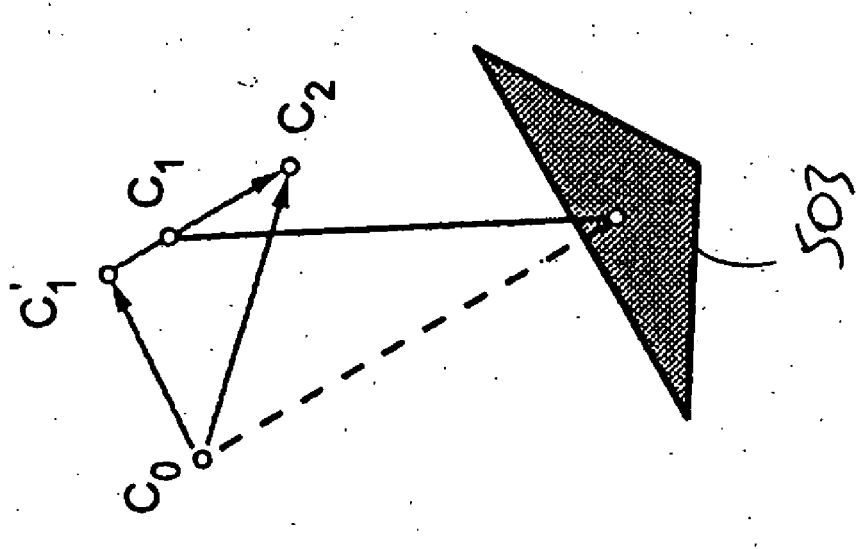
FIG. 10B depicts an example of a data stream item in blending binding mode, according to one embodiment of the present invention.
Figure 10B:
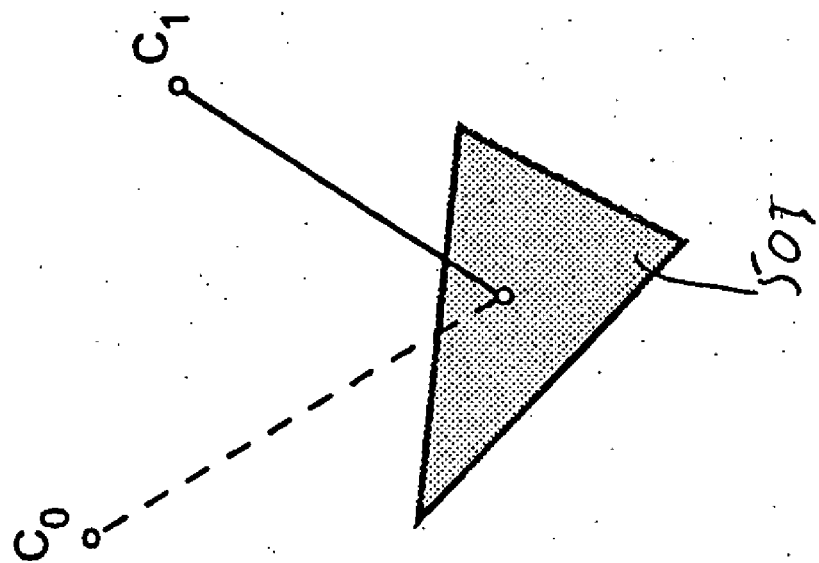
Figure 10C:
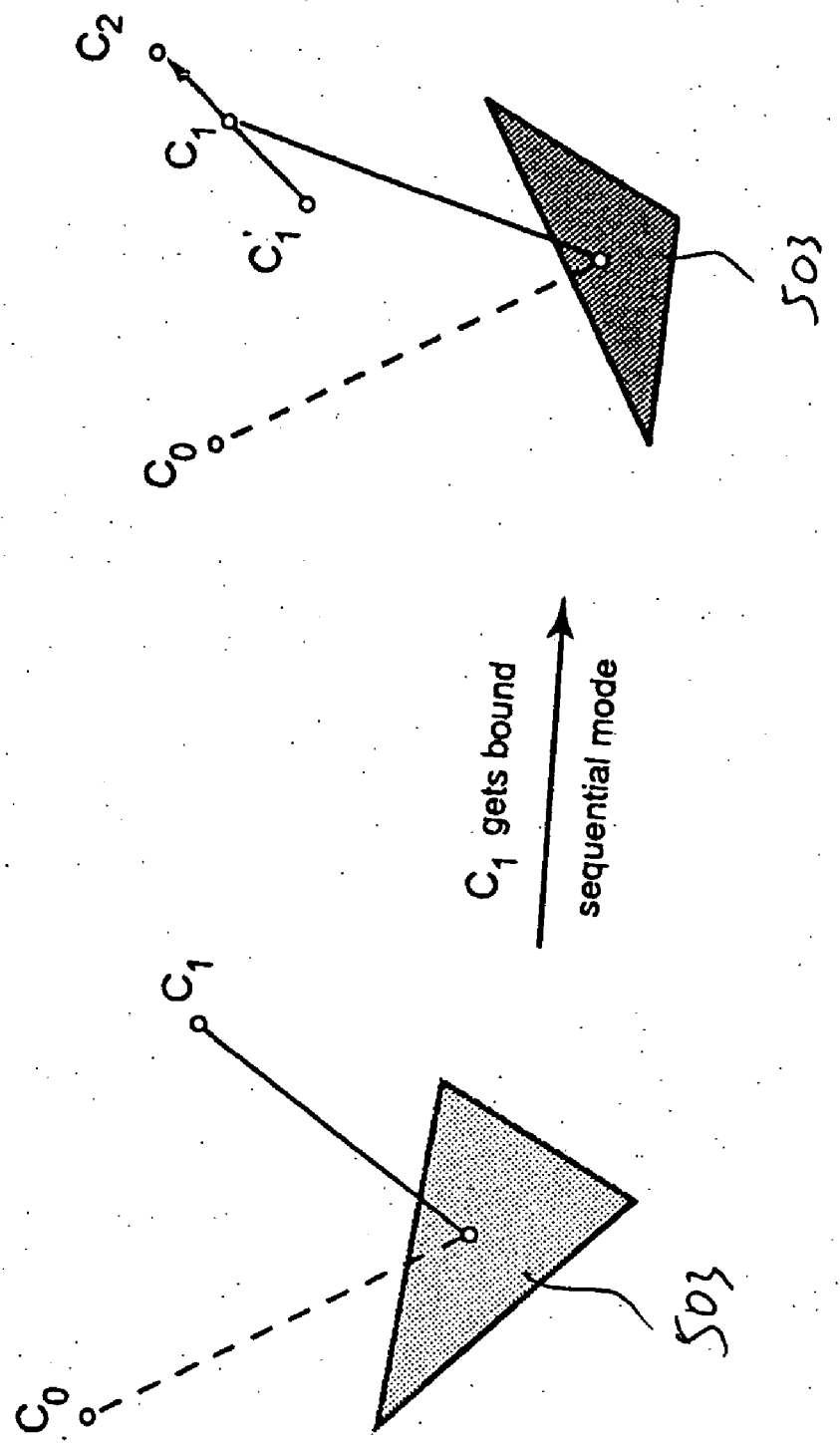
FIG. 10C depicts an example of a data stream item in sequential binding mode, according to one embodiment of the present invention.
Figure 10B:
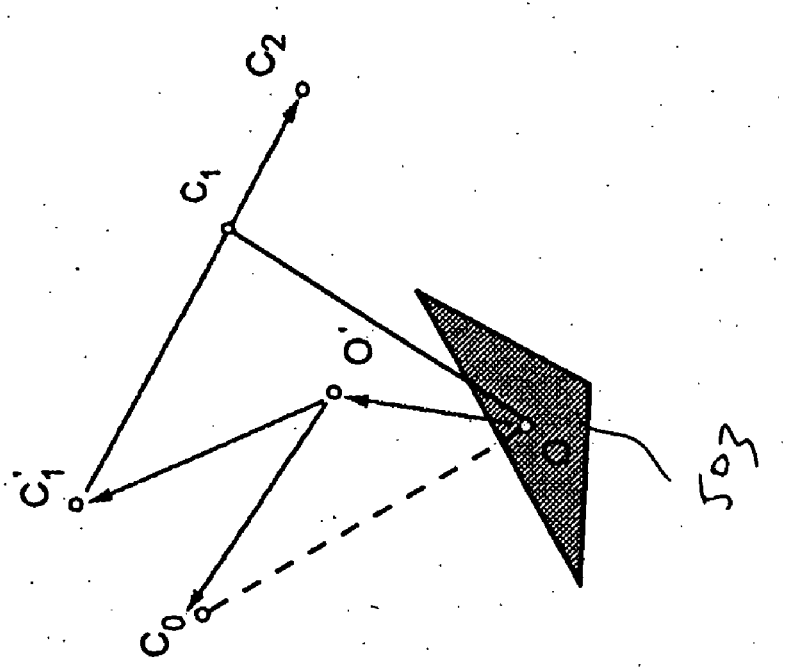
Figure 10B:
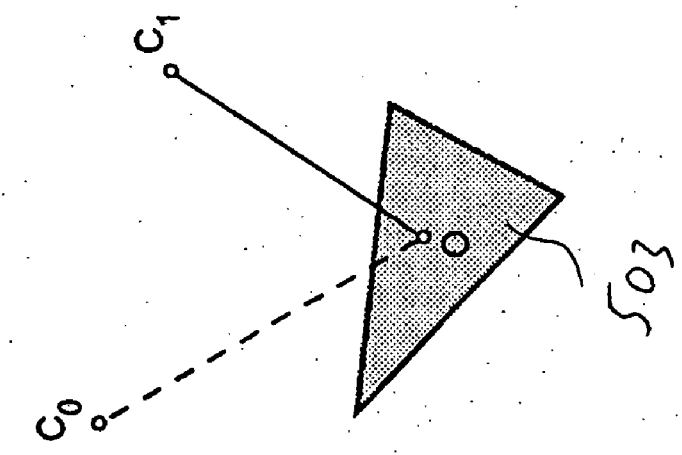

Referring now to FIGS. 10A to 10D, there are shown examples of a binding item 503 in (a) parallel mode, (b) blending mode, (c) sequential mode, and (d) hierarchical mode. In FIGS. 10A and 10B, the new local frame of coordinates binds to the initial vertex position $C_0$. In FIG. 10C (sequential mode), the new local frame of coordinates binds to the input current vertex position $C_1$. In FIG. 10D (hierarchical mode), the new local frame of coordinates binds to O, the origin of the input local frame of coordinates. Each mode will now be described in turn.

Parallel Binding mode: As depicted in FIG. 10A, the original vertex position $C_0$ is bound to the proxy/surface binding item 503, which may be, for example, a triangle in the case of a Loop Subdivision. Module 103 predicts a new position $C_2$ for $C_0$ based on the specific deformation algorithm of module 103. The diagram to the right of the arrow shows the result of the deformation: $C_0$ is still the original vertex position, $C'_1$ is the input current position, and $C_2$ is the new position predicted by the deformation algorithm of module 103. However, $C_2$ is not the actual output current position; $C_1$ is computed as the addition of the $C_0 C'_1$ and $C_0 C_2$ vectors, as shown in the Figure. Thus, in this mode, deformations are added in vector space regardless of the order in which they are applied. Furthermore, in one embodiment module 103 has an extra weight W parameter that controls the amount of deformation to be applied per vertex, so that the final current vertex position is an interpolation between $C_0$ and $C_1$, calculated as $C_0(1-W)+W C_1$.

Blending Binding mode: As depicted in FIG. 10B, the original vertex position $C_0$ is bound to the proxy/surface binding item 503. Module 103 predicts a new position for $C_0$ based on the specific deformation algorithm of module 103. The diagram to the right of the arrow shows the result of the deformation: $C_0$ is still the original vertex position, $C'_1$ is the input current position, and $C_2$ is the new position predicted by the deformation algorithm of module 103. Again, $C_2$ is not the actual output current position; $C_1$ is computed as an interpolation of the input current position $C'_1$ and the new predicted deformed position $C_2$. Hence, the deformations of module 103 in this mode are blended, or interpolated, with previous deformations layered on top of the deformed model. The weight W used to interpolate between $C'_1$ and $C_2$ is again a parameter of module 103.

Sequential Binding mode: As depicted in FIG. 10C, the current vertex position $C_1$ is bound to the proxy/surface binding item 503. Module 103 predicts a new position for $C_1$ based on the specific deformation algorithm of module 103. The diagram to the right of the arrow shows the result of the deformation: $C_0$ is still the original vertex position, $C'_1$ is the input current position, and $C_2$ is the new position predicted by the deformation algorithm of module 103. Again, $C_2$ is not the actual output current position; $C_1$ is computed as an interpolation of the input current position $C'_1$ and the new predicted deformed position $C_2$. The new deformed position is based on the input $C_1$ and not on the original $C_0$ it was in FIG. 10B. Accordingly the final deformation is layered on top of the result from previous deformations. The deformations of each module are layered upon one another, each module having a new offset of the current vertex position. As before, a weight W in module 103 yields the final current vertex position $C_1$ as the interpolation of $C'_1$ and $C_2$.

Hierarchical Binding mode:: As depicted in FIG. 10C, the origin of the local frame of coordinates O is bound to the proxy/surface binding item 503. Module 103 predicts a new position for $C_1$ based on the specific deformation algorithm of module 103. This algorithm moves the old origin O to a new location O' and then pivots the old $OC'_1$ offset to its new location $C_2$. The deformation contribution of module 103 maintains the old $OC_1$ offset and translates and pivots the location of that offset according to a new deformation algorithm. Again, the presence of a weight W in module 103 results in interpolation between the old current position $C'_1$ and the newly predicted $C_2$.

As will be clear to one skilled in the art, DDS 106, and in particular the binding item 503 embodiment described above, provides and can support additional layering deformation schemes, for example based on the local frame of coordinates $b_0$, $b_1$, $b_2$ or based on combinations of any of them.

Similarly it will be understood that pipeline 100 can have multiple modules 103 in various binding modes, in any order and sequence. Such flexibility enormously enhances the rigging possibilities for creating sophisticated CG character rigs.

Module 103 Attributes

In one embodiment, each module 103 has its own set of attributes, or parameters, that modify and control its behavior. These attributes can include some that are specific to a given type of deformation module 103, and some that are more general. Each attribute has a name. Examples of attributes include, without limitation:

Enabled: A Boolean attribute that enables/disables the action of module 103. When disabled, module 103 works in a pass-through mode, so that DDS 106 data is copied directly from input to output.

DDS In: An input connection for the input Deformation Data Stream 106 provided to module 103.

DDS Out: An output connection for the output Deformation Data Stream 106 resulted from module's 103 deformation.

Binding mode: Each module 103 can bind to incoming binding items 503 according to any of the four modes described above: parallel, blending, sequential and hierarchical.

Weight: Controls how much of the total deformation of module 103 is applied to the input DDS 106. When a module's 103 weight is 0, it has no deformation effect. A module 103 having a weight of 1 applies its deformation in full, while a module 103 having a weight of 0.5 generates output that represents a midpoint between a fully deformed geometry and the original undeformed geometry. In one embodiment, this weight controls the operation of module 103 as a whole, while a separate, per-binding site (bindingSite.weight) weight controls weights by individual binding site. Thus, if module 103 weight is denoted as W, and the weight associated with each binding site i is denoted as $s_i$, the deformation applied to the point associated with binding site i is the product $W \times s_i$.

Deformation Pipeline 100 Filtering and Masking

As described above, in one embodiment each binding item 503 in DDS 106 carries with it a tag (BindingItem::tag). The tag controls, at the vertex level, how each module 103 affects binding items 503 in DDS 106. In one embodiment, the following tags are available: UNKNOWN, UNBOUND, PARALLEL, BLENDING, SEQUENTIAL, HIERARCHICAL. One skilled in the art will recognize that other tags may also be provided.

In one embodiment, by default a binding item 503 starts in the UNKNOWN state; as the binding item 503 passes through pipeline 100, each module 103 deforms binding item 503 according to its own parameters and characteristics. For instance, a module 103 in parallel binding mode would modify UNKNOWN binding items 503 according to the parallel binding techniques described above.

However if the tag of binding item 503 is either PARALLEL, BLENDING, SEQUENTIAL or HIERARCHICAL then only modules 103 of the matching type modify binding item 503. Thus, the tag acts as a filter on the deformations that will be performed on binding item 503 as it passes through pipeline 100.

The UNBOUND tag specifies that binding items 503 are never deformed by modules 103 regardless of their binding mode. This tag allows a user to exclude binding items 503 from deformation pipeline 100 downstream.

In one embodiment, there are filter modules 103 that assign specific tags to bindingItems in DDS 106. These are assigned by various algorithms that do not break the independence of Deformation Pipeline 100 from CG model 151. An example of a filter module 103 is one that uses (x,y,z) coordinates and bounding boxes to specify regions covered by a given tag. Many other methods are possible.

Filter modules 103 can be placed anywhere in pipeline 100 in order to assign and modify tags of binding items 503 as they pass through as part of deformation pipeline 100. Once a binding item 503 receives a tag from a filter module 103 along pipeline 100, it carries that tag downstream; hence the behavior of all downstream modules 103 are affected by the same tag until a new filter module 103 is reached that may change the tag to another value.

Related very closely to filtering is the concept of "masking". Masking is supported through masking modules 103 which are attached as accessory modules to a deformation module 103. A masking module 103 assigns tags to bindingItems in DDS 106, but these tags live only within deformation module 103. Masking is a form of overriding the tags that vertices carry with them in DDS 106.

Figure 11:
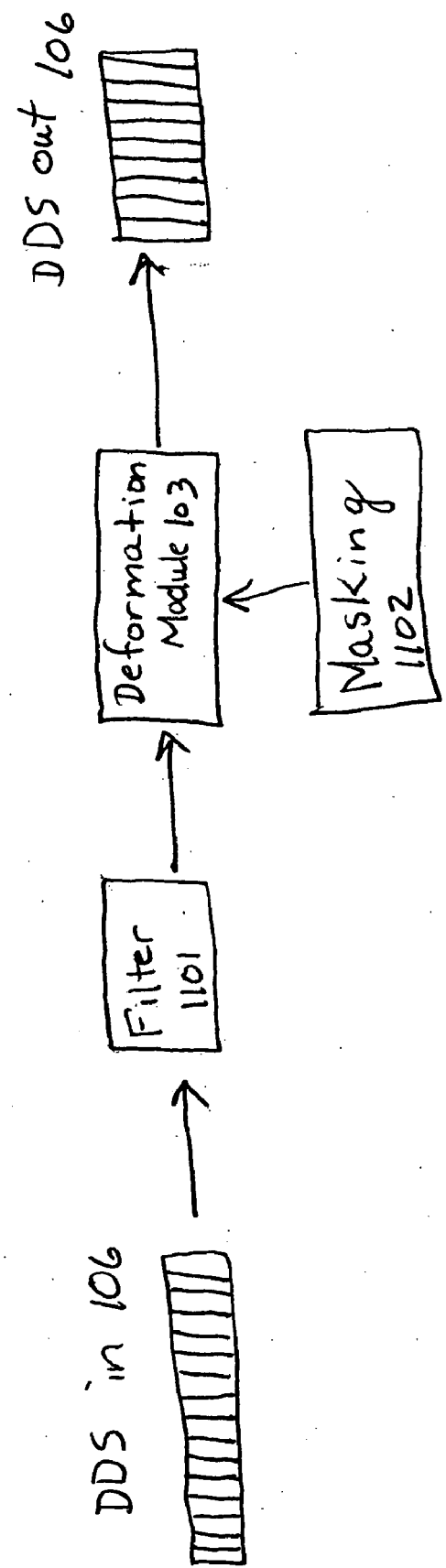
FIG. 11 is a block diagram depicting an example of a DDS item being passed through a filter and a deformation module that is modified by an accessory masking module.

Referring now to FIG. 11, there is shown an example of DDS 106 item being passed through filter module 1101 and deformation module 103 that is modified by accessory masking module 1102. The binding items 503 get new tags assigned at filter module 1101. However, as they arrive at deformation module 103, a masking tag can override their value. As the binding items 503 exit deformation module 103, they continue to carry the pre-mask tag value.

List of Modules

The following is a description of some examples of modules 103 that can be implemented in deformation pipeline 100 according to one embodiment: Head Module 102. Head module 102 converts geometry items 101 defined outside deformation pipeline 100 (such as NURBS, meshes, subdivision meshes, curves, points, and the like) into DDS 106. Module 102 initializes cvOrig and cvCurrent to be identical for all points. It also initializes binding items 503 to carry the origin of coordinates as its binding frame. Tail Module 104. Tail module 104 is the last node in pipeline 100. It converts DDS 106 items to actual geometry items 105 (such as NURBS, meshes, subdivision meshes, curves, points, and the like). In one embodiment, as described above, data stream 106 does not include topological information 351; such information travels by a parallel connection (Topology) from head module 102 to tail module 104. Such topological information 351 describes, for example, what type of geometry is represented by DDS 106, and also includes information describing the basis set and other properties.

CBinding or LBinding Modules 103. These are proxy/surface binding modules 103 that use polygonal meshes 402 as proxies. CBinding and LBinding modules 103 take a polygonal mesh 402 and convert it internally into a subdivision mesh 403 that acts as a surface binding for the incoming data stream 106. As polygonal mesh 402 moves during the animation phase, the binding domain drags binding sites along. For CBinding modules 103, the surface binding is quad-based; for LBinding modules 103, the surface binding is triangle-based.

In one embodiment, Cbinding modules 103 use the Catmull-Clark algorithm to compute the surface binding while Lbinding modules 103 use the Loop subdivision algorithm.

Figure 12A:
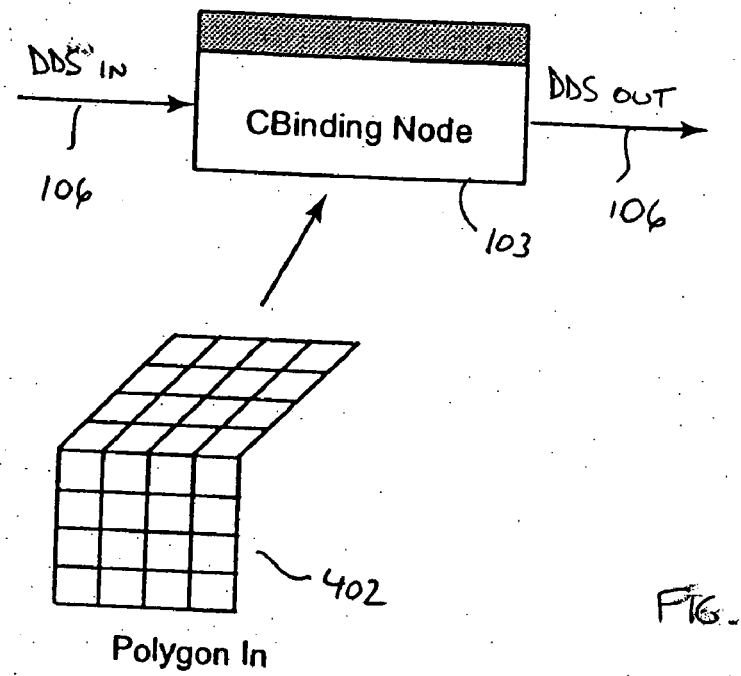
FIG. 12A is a block diagram depicting an embodiment of a Cbinding module in which a single polygonal proxy mesh is used.

Referring now to FIG. 12A, there is shown an embodiment of a Cbinding module 103 in which a single polygonal proxy mesh 402 is used. During the first connection, a copy of mesh 402 is cached in module 103 as a reference to the exact pre-deformed position of mesh 402. In one embodiment, binding items 503 of DDS 106 are bound dynamically to the Catmull-Clark surface generated from this cached mesh 402. As the input polygonal mesh 402 deforms under animation curves or other rigs, its own Catmull-Clark surface provides updated positions to the local frames of coordinates, hence providing a driving force for the deformation.

Figure 12B:
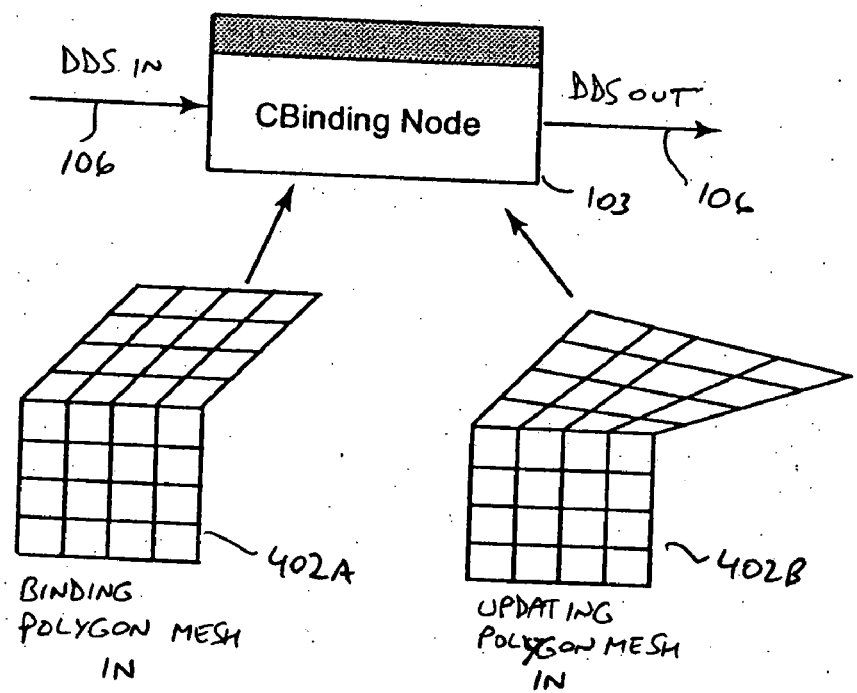
FIG. 12B is a block diagram depicting an embodiment of a Cbinding module in which two topologically identical polygonal meshes are used, one for binding and one for updating the binding items.

Referring now to FIG. 12B, there is shown an embodiment of a Cbinding module 103 in which two polygonal meshes 402A, 402B are connected to CBinding module 103. Binding mesh 402A (also known as a reference mesh) is a reference to a surface where binding items are bound. Updating mesh 402B (also known as a life mesh) is the one that is edited and that updates positions of local frames of coordinates for the vertices. A user can deform both meshes 402A, 402B.

CurveBinding Module 103. CurveBinding modules 103 use a parametric curve as a binding domain. As with the CBinding module 103 described above, CurveBinding module 103 can be implemented either with a reference mesh 402A or without one.

Filter Module 103. In one embodiment, for each binding item 503 in DDS 106, an integer tag (BindingItem::tag) travels with the point along pipeline 100. The effect of a deformation module 103 on a vertex in DDS 106 can be modified depending on the value of this tag. For example, if the tag for a vertex is (UNBOUND), then no deformation module 103 along pipeline 100 binds to it to deform it.

Mask Module 103. A mask module 103 is similar in some respects to a filter module 103. It is also used to exclude certain deformations from certain regions. In one embodiment, mask module 103 connects directly to binding deformation modules 103. It includes a masking of the binding domain, so that it can cancel the contributions of deformation module 103 to binding items 503 connected to certain areas of the binding domain.

Weighting Module 103. A weighting module 103 connects directly to the binding deformation module 103, and manages the per-point (binding item 503) weighting to be used during deformation. Weighting module 103 can therefore be used to fine-tune deformations for selected areas of the character being animated. Weights can be assigned to binding items 503 per ID or by geographical area. Weights can also be attached directly to binding items 503 or indirectly through the binding domain where points are attached.

Relaxer Module 103. A relaxer module 103 allows a user to add physical properties to polygonal mesh 403 (as in CBinding) to make animation more realistic. For example, a relaxer module 103 can be used to add or specify elasticity, inertia, drag, and other properties to the deformation. Relaxer module 103 can also be used to fix continuity problems on deformed surfaces 152.

Other Modules 103. As will be apparent to one skilled in the art, many other modules 103 can also be implemented according to well-known techniques. Such modules 103 include, for example, objects of influence, particle sources and sinks, and the like. Algorithms for performing such operations are well known in the art.

Weighting

In one embodiment, an overall sum of weights for deformations applied to a single input vertex is 1. In one embodiment, the system of the present invention performs a normalization operation to ensure that the sum of the weights is 1, so as to avoid spurious artifacts in the geometry that can result if the sum is some other value.

In one embodiment, the system of the present invention performs such normalization while maintaining serialization of operations. Per-module weights, W, are specified in relative terms; they represent the amount of deformation to be applied by a module 103 with reference to the input at that module 103, and without reference to overall pipeline 100 or to any other modules 103. Thus, for example, a pipeline 100 might have seven modules 103, all of which have weights of 0.5. Since each module 103 applies its weight only with reference to its particular input stream 106 and its own deformation operations, such values are consistent and do not lead to spurious artifacts. Each module 103 applies half of its deformation and blends with half of the incoming data stream 106.

At the beginning of pipeline 100, binding items are given a weight of 1. This weight is the total amount of deformation that each vertex can experience. As data stream 106 passes from one module 103 to another, each module's 103 deformation weight is subtracted from the weighting of binding item 503. For example, if first deformation module 103 has a weight of 1.0, then upon output, binding item 503 has a weight of 0.0 and cannot be affected by any further deformations. On the other hand, if first deformation module 103 has a weight of 0.25, then upon output, binding item 503 has a weight of 0.75 and further deformations on the point are still possible.

Figure 13:
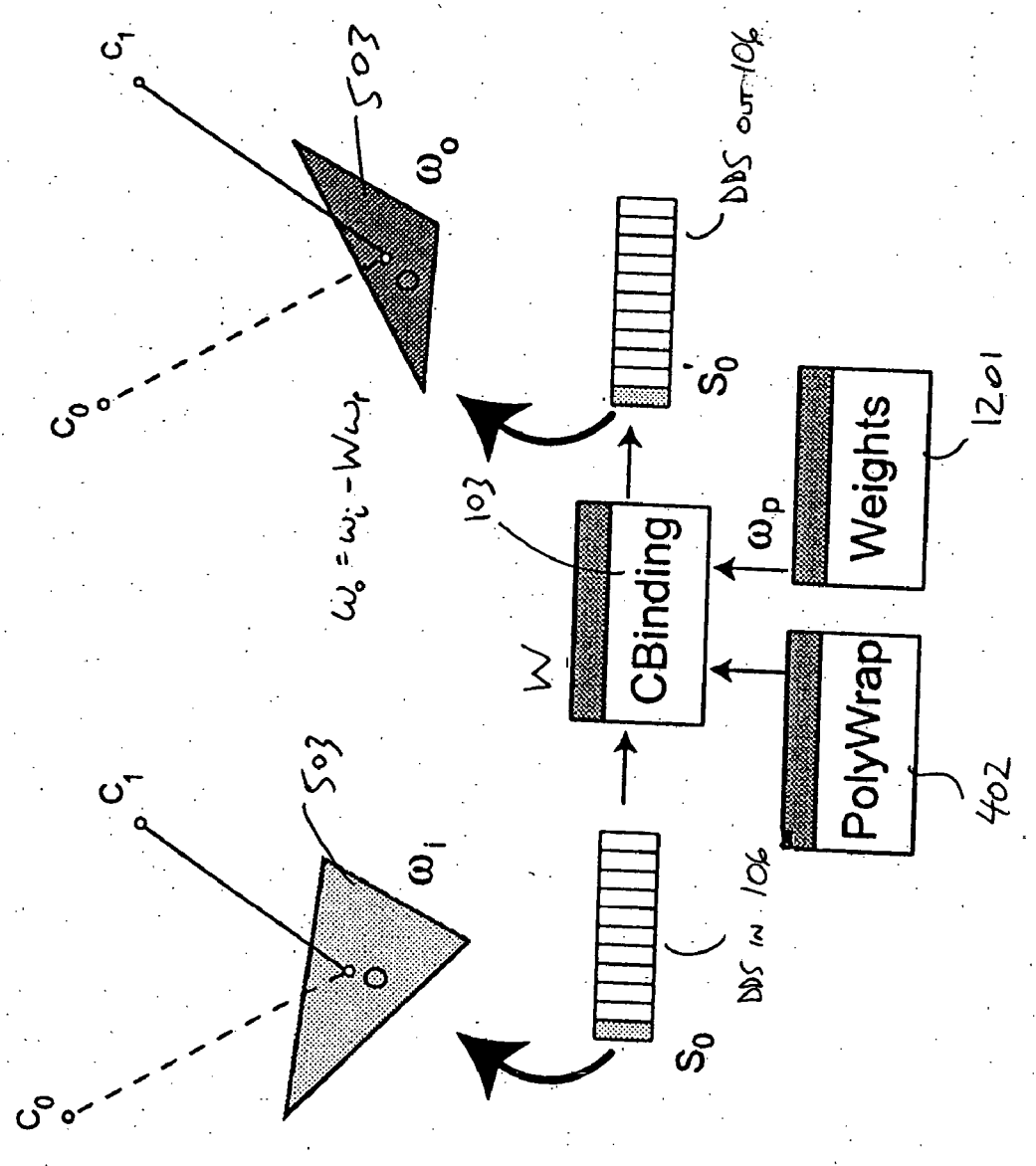
FIG. 13 is a block diagram depicting weight application and determination, according to one embodiment.

Referring now to FIG. 13, there is shown an example of weight application and determination according to one embodiment. CBinding module 103 is shown with its attached polygonal mesh 402 and a weights module 1201. CBinding module 103 has a local weight of W. On input, binding item 503 of DDS 106 has a weight of $w_i$; on output, a weight of $w_o$ remains. CBinding module 103 performs a deformation on the input control vertex with a local weight of $Ww_p$, where $w_p$ is the per-vertex weighting provided by weights module 1201. Thus, if module 103 is in parallel binding mode and the total point weight is W $w_p$=0.75, then CBinding module 103 would perform an interpolation between the fully deformed position $C_2$ and the original position $C_0$ with a weighting of 0.75 and 0.25, respectively.

The deformation pipeline of the present invention provides a number of advantages over prior art techniques. These include, for example:

Providing a flexible, advanced and extensible deformation mechanism using as few nodes as possible.

Providing a deformation pipeline independent of the specifics of the CG model details, thus allowing users to create character rigs that are more portable among characters.

Providing a deformation pipeline which by design tolerate editing changes to the CG model(s) being deformed without invalidating the character rig.

Providing a generic deformation pipeline capable of processing batches of characters that are morphologically similar.

Providing a deformation architecture that can easily be implemented in hardware, particularly since each node is independent and serialized.

Providing a simple abstract interface for deformation nodes that facilitates easy extension to the pipeline, yet allows sufficient generality to carry unforeseen types of user-defined data.

Providing support for per-vertex attributes, filtering, weighting and masking.

The foregoing description of the embodiments of the invention has been presented for the purposes of illustration and description. It is not intended to be exhaustive or to limit the invention to the precise forms disclosed. Persons skilled in the relevant art can appreciate that many modifications and variations are possible in light of the above teaching. Persons skilled in the art will recognize various equivalent combinations and substitutions for various components shown in the figures. It is therefore intended that the scope of the invention be limited not by this detailed description, but rather by the claims appended hereto.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented as a standalone software application for installation and execution on a general purpose computer or workstation. Alternatively, it can be implemented as a plug-in for an existing software application.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. The present invention can also be implemented in hardware, for example in a specialized graphics card for performing computer animation operations.

The algorithms and modules presented herein are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or gram, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

What is claimed is:

1. An animation deformation pipeline embodied in a computer-readable storage medium, comprising:

a head node embodied in a computer-readable medium, the head node configured to convert a geometric representation of an object into a data stream;

a plurality of deformation nodes embodied in a computer-readable medium, each deformation node configured to receive the data stream from a node, and for applying a deformation to the data stream;

a tail node embodied in a computer-readable medium, the tail node configured to convert the deformed data stream into a geometric representation of a deformed object wherein topology information describing the topology makeup of the geometry encoded in the data stream is passed through the plurality of deformation nodes separate from the data stream without altering the topology information.

2. The animation deformation pipeline of claim 1, wherein at least a subset of the deformation nodes apply deformations in response to manipulation of a polygonal proxy model.

3. The animation deformation pipeline of claim 1, wherein each deformation node passes the data stream to a succeeding node.

4. The animation deformation pipeline of claim 1, wherein at least a subset of the deformation nodes apply deformations using a sequential binding mode.

5. The animation deformation pipeline of claim 4, wherein, at least a subset of the deformation nodes apply deformations to the result of a previous deformation node.

6. The animation deformation pipeline of claim 4, wherein each deformation node receives, within the data stream, a representation of i point, deforms the point, and passes, to a succeeding node, a representation of the deformed point.

7. The animation defonnation pipeline of claim 1, wherein at least a subset of the deformation nodes apply deformations using a parallel binding mode.

8. The animation deformation pipeline of claim 7, wherein at least a subset of the deformation nodes apply deformations by combining influences of at least two polygonal proxy models.

9. The animation deformation pipeline of claim 7, wherein each deformation node receives, within the data stream, a representation of a point, deforms the point, and passes, to a succeeding node, a representation of the undeformed point.

10. The animation deformation pipeline of claim 7, wherein each deformation node receives, within the data stream, a representation of a point, deforms the point, and passes, to a succeeding nod; a representation of the deformed point and a representation of the undeformed point.

11. The animation deformation pipeline of claim 1, wherein at least a subset of the defonnation nodes apply deformations using a blend binding mode.

12. The animation deformation pipeline of claim 11, wherein at least a subset of the deformation nodes generate output that interpolates a current deformation with output of at least one other deformation node.

13. The animation deformation pipeline of claim 1, wherein at least a subset of the deformation nodes apply deformations using a hierarchical binding mode.

14. The animation deformation pipeline of claim 13, wherein at least a subset of the deformation nodes apply deformations to a local origin point of an input binding site.

15. The animation deformation pipeline of claim 1, wherein at least a subset of the deformation nodes are associated with a user-specifiable weight parameter that controls the relative amount of deformation applied by the node.

16. The animation deformation pipeline of claim 15, wherein each deformation node associated with a user-specifiable weight generates output representing a weighted combination of the input to the deformation node and the result of the deformation applied by the node.

17. The animation deformation pipeline of claim 15, wherein the weights are normalized over the entire pipeline.

18. The animation deformation pipeline of claim 15, wherein the weights are not normalized.

19. The animation deformation pipeline of claim 1, wherein each deformation node applies its deformation by:
   determining a binding site for at least one control vertex of the object; transforming the binding site;
   propagating the transformation of the binding site to the control vertex of the object, to establish a new location for the control vertex; and deforming the object according to the new location of the control vertex.

20. The animation deformation pipeline of claim 17, wherein the binding sites are locations in a subdivision surface.

21. The animation deformation pipeline of claim 19, wherein the binding sites are components of a polygonal proxy model, and wherein propagating the transformation comprises deforming a subdivision surface, wherein to subdivision surface passes smooth deformations to the control vertices of the object.

22. The animation deformation pipeline of claim 1, wherein each deformation node generates data stream output for another node, the data stream output comprising a representation of to deformed object.

23. The animation deformation pipeline of claim 1, wherein the data stream comprises a plurality of binding items to be deformed by deformation nodes.

24. The animation deformation pipeline of claim 23, wherein the binding items comprise tags specifying binding modes.

25. The animation deformation pipeline of claim 24, wherein each deformation node has a binding mode, and wherein each deformation node applies deformations on binding items having a tag specifying a matching binding mode.

26. The animation deformation pipeline of claim 24, further comprising at least one filter node for modifying tags.

27. The animation deformation pipeline of claim 24, wherein at least one binding item comprises a tag specifying that no deformations are to be applied, and wherein the deformation nodes allow the binding item having the tag to pan without deformation.

28. The animation deformation pipeline of claim 24, further comprising at least one masking node for modifying tags.

29. The animation deformation pipeline of claim 28, wherein the masking node modifies a tag to specify that a binding item be excluded from deformation by a particular deformation node.

30. The animation deformation pipeline of claim 1, wherein each node comprises a graphics hardware component.

31. The animation-deformation pipeline of claim 1, wherein: the object comprises a plurality of surfaces;
   the data stream comprises at least one data block for each surface of the object;
   and each deformation node applies a defonnation by modifying at least one data block associated with the object surface being deformed.

32. The animation deformation pipeline of claim 31, wherein each surface is associated with a plurality of control vertices, and wherein each data block
   comprises a binding item entry for each control vertex of the surface associated with the data block.

33. The animation deformation pipeline of claim 1, wherein each deformation node comprises a user-specifiable attribute for enabling and disabling the node.

34. The animation deformation pipeline of claim 1, wherein each deformation node comprises a user-specifiable attribute indicating a blending mode.

35. The animation deformation pipeline of claim 1, wherein each deformation node comprises a user-specifiable attribute indicating a weighting factor.

36. A method for deforming a computer-generated object using a deformation pipeline, comprising:
   converting a geometric representation of an object into a data steam;
   for each of a plurality of deformation nodes, receiving the data stream and applying a deformation to the data stream;
   passing topology information describing topology makeup of the geometry encoded in the data stream through the plurality of deformation nodes separate from the data stream without altering the topology information;
   converting the deformed data stream into a geometric representation of a deformed object; and
   displaying the geometric representation of the deformed object.

37. The method of claim 36, wherein for at least a subset of the deformation nodes, applying a deformation comprises applying the deformation in response to manipulation of a polygonal proxy model.

38. The method of claim 36, further comprising, for each of the deformation nodes, passing the data stream to a succeeding node.

39. The method of claim 36, wherein for at least a subset of the deformation nodes, applying a deformation comprises applying the deformation using a sequential binding mode.

40. The method of claim 39, wherein for at least a subset of the defonnation nodes, applying a deformation comprises applying the deformation to the result of a previous deformation node.

41. The method of claim 39, further comprising, for each of the deformation nodes, receiving within the data stream a representation of a point, deforming the point, and passing, to a succeeding node, a representation of the deformed point.

42. The method of claim 36, wherein for at least a subset of the deformation nodes, applying deformations comprises using a parallel binding mode.

43. The method of claim 42, wherein for at least a subset of the deformation nodes, applying a deformation comprises combining influences of at least two polygonal proxy models.

44. The method of claim 42, wherein each deformation node receives, within the data stream, a representation of a point, deforms the point, and passes, to a succeeding node, a representation of the undeformed point.

45. The method of claim 42, further comprising, for each of the deformation nodes, receiving, within the data stream, a representation of a point, deforming the point, and passing, to a succeeding node, a representation of the deformed point and a representation of the undeformed point.

46. The method of claim 36, wherein for at least a subset of the deformation nodes, applying a deformation comprises applying deformations using a blend binding mode.

47. The method of claim 46, further comprising, for at least a subset of the deformation nodes interpolating a current deformation with output of at least one other deformation node.

48. The method of claim 36, wherein for at least a subset of the deformation nodes, applying a deformation comprises applying deformations using a hierarchical binding mode.

49. The method of claim 48, wherein for at least a subset of the deformation nodes, applying a deformation comprises applying deformations to a local origin point of an input binding site.

50. The method of claim 36, further comprising, for at least a subset of the deformation nodes, receiving a user-specifiable weight parameter controlling the relative amount of deformation applied by the node.

51. The method of claim 50, further comprising, for at least a subset of the deformation nodes, generating output representing a weighted combination of the input to the deformation node and the result of the deformation applied by the node.

52. The method of claim 50, further comprising normalizing the weights over the entire pipeline.

53. The method of claim 36, wherein, fur at least a subset of the deformation nodes, applying a deformation node comprises:
 determining a binding site for at least one control vertex of the object;
 transforming the binding site;
 propagating the transformation of the binding site to the control vertex of the object, to establish a new location for the control vertex; and deforming the object according to the new location of the control vertex.

54. The method of claim 53, wherein the binding sites are locations in a subdivision surface.

55. The method of claim 53, wherein the binding sites are components of a polygonal proxy model, and wherein propagating the transformation comprises deforming a subdivision surface, wherein the subdivision surface passes smooth deformations to the control vertices of the object.

56. The method of claim 36, further comprising, for each deformation node, generating data stream output for another node, the data stream output comprising a representation of the deformed object.

57. The method of claim 36, wherein the data stream comprises a plurality of binding items to be deformed by deformation nodes.

58. The method of claim 57, wherein the binding items comprise tags specifying binding modes.

59. The method of claim 58, wherein each deformation node has a binding mode, and wherein, for each deformation node, applying a deformation comprises applying a deformation on binding items having a tag specifying a matching binding mode.

60. The method of claim 36, wherein:
 the object comprises a plurality of surfaces;
 the data stream comprises at least one data block for each surface of the object;
 and wherein, for each deformation node, applying a deformation comprises modifying at least one data block associated with the object surface being deformed.

61. The method of claim 60, wherein each surface is associated with a plurality of control vertices, and wherein each data block comprises a binding item entry for each control vertex of the surface associated with the data block.

62. The meted of claim 36, further comprising, for each deformation node, receiving a user-specifiable attribute for enabling and disabling the node.

63. The method of claim 36, further comprising, further each deformation node, receiving a user-specifiable attribute indicating a blending mode.

64. The method of claim 36, further comprising, for each deformation node, receiving a user-specifiable attribute indicating a weighting factor.

65. A computer program product for defaming a computer-generated object using a deformation pipeline, comprising:
 a computer-readable medium; and
 computer program code, encoded on the medium, for:
 converting a geometric representation of an object into a data stream;
 for each of a plurality of deformation nodes, receiving the data stream and applying a deformation to the data stream;
 passing topology information describing the topology makeup of the geometry encoded in the data stream through the plurality of deformation nodes separate from the data stream without altering the topology information; and
 converting the deformed data stream into a geometric representation of a deformed object.

66. The computer program product of claim 65, wherein for at least a subset of the deformation nodes, the computer program code for applying a deformation comprises computer program code for applying the deformation in response to manipulation of a polygonal proxy model.

67. The computer program product of claim 65, further comprising computer program code for, for each of the deformation nodes, passing the data stream to a succeeding node.

68. The computer program product of claim 65, wherein for at least a subset of the deformation nodes, the computer program code for applying a deformation comprises computer program code for applying the deformation using a sequential binding mode.

69. The computer program product of claim 68, wherein for at least a subset of the deformation nodes, the computer program code for applying a deformation comprises computer program code for applying the deformation to the result of a previous deformation node.

70. The computer program product of claim 68, further comprising, for each of the deformation nodes, computer program code for receiving within the data stream a representation of a point, deforming the point, and passing, to a succeeding node, a representation of the deformed point.

71. The computer program product of claim 65, wherein for at least a subset of the deformation nodes, the computer program code for applying deformations uses a parallel binding mode.

72. The computer program product of claim 71, wherein for at least a subset of the deformation nodes, the computer program code for applying a deformation comprises computer program code for combining influences of at least two polygonal proxy models.

73. The computer program product of claim 71, wherein each deformation node receives, within the data stream, a representation of a point, deforms the point, and passes, to a succeeding node, a representation of the undeformed point.

74. The computer program product of claim 71, further comprising, for each of the deformation nodes, computer program code for receiving, within the data stream, a representation of a point, deforming the point, and passing, to a succeeding node, a representation of the deformed point and a representation of the undeformed point.

75. The computer program product of claim 65, wherein for at least a subset of the deformation nodes, the computer program code for applying a deformation comprises computer program code for applying deformations using a blend binding mode.

76. The computer program product of claim 75, further comprising computer program code for, for at least a subset of the deformation nodes interpolating a current deformation with output of at least one other deformation node.

77. The computer program product of claim 65, wherein for at least a subset of the deformation nodes, the computer program code for applying a deformation comprises computer program code for applying deformations using a hierarchical binding mode.

78. The computer program product of claim 77, wherein for at least a subset of the deformation nodes, the computer program code for applying a deformation comprises computer program code for applying deformations to a local origin point of an input binding site.

79. The computer program product of claim 65, further comprising, for at least a subset of the deformation nodes, computer program code for receiving a user-specifiable weight parameter controlling the relative amount of deformation applied by the node.

80. The computer program product of claim 79, further comprising, for at least a subset of the deformation nodes, computer program code for generating output representing a weighted combination of the input to the deformation node and the result of the deformation applied by the node.

81. The computer program product of claim 79, further comprising computer program code for normalizing the weights over the entire pipeline.

82. The computer program product of claim 65, wherein, for at least a subset of the deformation nodes, the computer program code for applying a deformation node comprises computer program code for:
- determining a binding site for at least one control vertex of the object; transforming the binding site;
- propagating the transformation of the binding site to the control vertex of the object, to establish a new location for the control vertex; and deforming the object according to the new location of the control vertex.

83. The computer program product of claim 82, wherein the binding sites are locations in a subdivision surface.

84. The computer program product of claim 82, wherein the binding sites are components of a polygonal proxy model, and wherein the computer program code for propagating the transformation comprises computer program code for deforming a subdivision surface, wherein the subdivision surface passes smooth deformations to the control vertices of the object.

85. The computer program product of claim 65, further comprising, for each deformation node, computer program code for generating data stream output for another node, the data stream output comprising a representation of the deformed object.

86. The computer program product of claim 65, wherein the data stream comprises a plurality of binding items to be deformed by deformation nodes.

87. The computer program product of claim 86, wherein the binding items comprise tags specifying binding modes.

88. The computer program product of claim 87, wherein each deformation node has a binding mode, and wherein, for each deformation node, the computer program code for applying a deformation comprises computer pro gram code for applying a deformation on binding items having a tag specifying a matching binding mode.

89. The computer program product of claim 65, wherein:
the object comprises a plurality of surfaces;
the data stream comprises at least one data block for each surface of the object;
and wherein, for each deformation node, the computer program code for applying a deformation comprises computer program code for modifying at least one data block associated with the object surface being deformed.

90. The computer program product of claim 89, wherein each surface is associated with a plurality of control vertices, and wherein each data block comprises a binding item entry for each control vertex of the surface associated with the data block.

91. The computer program product of claim 65, further comprising, for each deformation node, computer program code for receiving, a user-specifiable attribute for enabling and disabling the node.

92. The computer program product of claim 65, further comprising, for each deformation node, computer program code for receiving a user-specifiable attribute indicating a blending mode.

93. The computer program product of claim 65, further comprising, for each deformation node, computer program code for receiving a user-specifiable attribute indicating a weighting factor.

* * * * *